United States Patent
Lecompere

(10) Patent No.: US 12,420,480 B2
(45) Date of Patent: Sep. 23, 2025

(54) METHOD AND MACHINE FOR THE PRODUCTION OF AN OPTICAL ELEMENT BY ADDITIVE MANUFACTURING

(71) Applicant: ESSILOR INTERNATIONAL, Charenton-le-Pont (FR)

(72) Inventor: Maxime Lecompere, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 200 days.

(21) Appl. No.: 18/269,087

(22) PCT Filed: Dec. 21, 2021

(86) PCT No.: PCT/EP2021/087049
§ 371 (c)(1),
(2) Date: Jun. 22, 2023

(87) PCT Pub. No.: WO2022/136407
PCT Pub. Date: Jun. 30, 2022

(65) Prior Publication Data
US 2024/0042683 A1    Feb. 8, 2024

(30) Foreign Application Priority Data

Dec. 23, 2020 (EP) .................................. 20306675

(51) Int. Cl.
*B29C 64/135* (2017.01)
*B29C 64/255* (2017.01)
(Continued)

(52) U.S. Cl.
CPC .......... *B29C 64/135* (2017.08); *B29C 64/255* (2017.08); *B29C 64/393* (2017.08);
(Continued)

(58) Field of Classification Search
None
See application file for complete search history.

(56) References Cited

U.S. PATENT DOCUMENTS 5,182,056 A * 1/1993 Spence ............... G03F 7/70416
                                                        118/712
12,023,864 B2 * 7/2024 Lecompere ...... B29D 11/00432
(Continued)

FOREIGN PATENT DOCUMENTS

EP          3698968          8/2020

OTHER PUBLICATIONS

International Search Report issued in corresponding PCT Application No. PCT/EP2021/087049, mailed Mar. 14, 2022.

*Primary Examiner* — Yung-Sheng M Tsui
(74) *Attorney, Agent, or Firm* — Norton Rose Fulbright US LLP

(57) ABSTRACT

The disclosure relates to a method and a device for the production of an optical element from a curable material by using an additive manufacturing technology. According to the disclosure, this method comprises: A—providing a curable material; B—curing said curable material inside sliced outlines (C1) whose geometry are determined according to the geometry of said optical element, said optical element comprising at least: a first volume element (V1) and a second volume element (V2), by forming the first volume element (V1) by irradiating the curable material with at least a first curing surface energy (E1) with a first light depth penetration value within the curable material (Dp1), and forming the second volume element (V2) by irradiating the curable material with at least a second curing surface energy (E2) with a second light depth penetration value within the curable material (Dp2), wherein said second light depth penetration value within the curable material (Dp2) is dif- (Continued)

ferent from the first light depth penetration value within the curable material (Dp1).

18 Claims, 8 Drawing Sheets

(51) Int. Cl.
    *B29C 64/393*     (2017.01)
    *B33Y 10/00*     (2015.01)
    *B33Y 50/02*     (2015.01)
    *B33Y 80/00*     (2015.01)

(52) U.S. Cl.
    CPC .............. *B33Y 10/00* (2014.12); *B33Y 50/02* (2014.12); *B33Y 80/00* (2014.12)

(56) References Cited

U.S. PATENT DOCUMENTS

| | | | |
|---|---|---|---|
| 2007/0194499 A1* | 8/2007 | Andino | B29C 64/135 264/401 |
| 2017/0102679 A1 | 4/2017 | Greene et al. | |
| 2018/0361666 A1* | 12/2018 | Adzima | B29C 35/0888 |
| 2022/0347917 A1* | 11/2022 | Lecompere | B29D 11/00009 |

* cited by examiner

METHOD AND MACHINE FOR THE PRODUCTION OF AN OPTICAL ELEMENT BY ADDITIVE MANUFACTURING

CROSS-REFERENCE TO RELATED APPLICATIONS

This application is a national phase application under 35 U.S.C. § 371 of International Application No. PCT/EP2021/087049 filed 21 Dec. 2021, which claims priority to European Patent Application No. 20306675.8 filed 23 Dec. 2020. The entire contents of each of the above-referenced disclosures is specifically incorporated by reference herein without disclaimer.

TECHNICAL FIELD OF THE DISCLOSURE

The disclosure relates to the manufacturing of optical components, for example ophthalmic lenses.

More precisely the disclosure relates to a process for manufacturing an optical element from a curable material using an additive manufacturing technology.

The disclosure also describes a manufacturing system for manufacturing an optical element from a curable material using an additive manufacturing technology.

BACKGROUND INFORMATION AND PRIOR ART

The additive manufacturing technologies are suitable for manufacturing many devices, particularly for manufacturing prototype devices within the framework of the development of new technologies as the final obtained device is directly formed with the required shape.

However, in the current stage of development, the additive manufacturing technologies are rarely adapted to be used as an industrial tool for mass production of ophthalmic devices.

The additive manufacturing technologies refer to methods in which a three dimensional (3D) object is produced or "printed" from a polymerizable or curable material, such as a resin. Especially, the additive manufacturing technologies are usually based on a building process (i.e. printing) consisting in juxtaposing volume elements (voxels) in x, y and z directions, in general layer-by-layer or drop-by-drop, by irradiating and curing the resin, so as to reproduce, for each layer or drop, a projected predetermined pattern or image. This predetermined pattern or image is for instance a pixelated pattern or a pixelated image intended to form the expected numerical voxels. The intended object is thus formed by the overlapping of layers, pseudo layers, or drops of said cured material.

For instance, an additive manufacturing technology may be in practice the Digital Light Processing Stereolithography (named hereafter DLP-SLA). DLP-SLA uses a digital projector screen to project an image of each layer across the entire surface of the curable material. As the projector is a digital screen, the image of each layer is composed of square pixels, resulting in a layer formed from small rectangular bricks called as mentioned above "volume elements" or "voxels" (e.g. volume defined by the square pixel and the thickness of the layer). It has been noted that this digital screen generally used LCD or LED pixels and comprises therefore interspaces disposed between these pixels. Because the LCD or LED pixels are separated from each other by an interspace, the projected pattern on the surface of the curable material thus comprises some shadowed areas which receive slightly less energy.

Regarding the manufacturing of ophthalmic lenses, especially for eyeglasses, the additive manufacturing technologies may be used to produce models of ophthalmic lenses. However, these models are rarely adapted to be used in a frame in order to be worn by a wearer.

Indeed, the geometry of the intended optical article, such as an ophthalmic lens has to be accurate, especially at its periphery, for instance so as to reproduce the adequate curvature of the ophthalmic lens. Therefore, the accuracy of the building/printing process of the curable material is important. The building process is considered as "accurate" when the shape of the printed volume elements or voxels is the closest as possible to the shape of the expected numerical volume elements or voxel, in other words, when the resolution in the x, y and z directions is good.

In addition, an accumulation, within the manufactured optical device, of the interfaces between the layers of volume elements (or drops and/or the traces of pixels present within the irradiating tools) often forms slight optical defects, and in particular diffracting defects. Some of these defects, called thereafter layering induced defects, appear at the interface between the layers, because the curable material located on either side of this interface has cured/hardened at different times, which generates local differences in optical properties of the material, leading to defects between the layers. It has been noted that the formation of an optical device with a stacking of a multiplicity of layers induces a repetition of the predetermined pattern, and such repetitive alternation of optical properties induces the formation of diffracting defects. The shadowed areas due to the interspaces between the pixels also contribute to create diffracting defects. Moreover, the hardening of the material in a single layer also occurs not uniformly but rather voxel by voxel, which also generates diffraction between these voxels.

These defects are critical when the ophthalmic lens is finally used.

However, the requirement of this printing accuracy of the curable material and the requirement of getting a homogeneous optical volume during the building process, that is to say without diffracting defects, are strongly incompatible.

Indeed, in general by increasing the accuracy of a curable material, the diffracting defects created are more marked.

On the one hand, when the additive manufacturing technology is based on the projection of an ultraviolet light pattern on a curable material, a way to improve the printing accuracy of a curable material consists in adding in the curable material composition one or more UV blocker that absorb(s) at the wavelength of irradiation. In fact, this or these UV blocker(s) enable(s) to control propagation of light over undesired zones.

On the other hand, to reduce the diffracting defects, a solution already devised by the Applicant for forming an optical element is to cure the material in multiple steps, such that each layer of material is not fully cured, or even not yet solid, when a further layer of material is formed or overlaid onto it. In particular, this solution enables to limit the difference of hardening between the two adjacent layers in such a manner that the layers optical properties are the closest and as homogenous as possible.

Indeed, according to this solution, before being hardened, the layers have to be still in a partially uncured state before depositing an overlaying layer. The partially uncured state of the layers may be in an intermediate state, which is neither solid nor liquid but between these two phases (this phase may be called "gel state" as explained hereinafter). This intermediate state allows adjacent layers to merge with each other without defect and avoid therefore the diffracting effect.

As it will be explained in more details hereafter, this solution implies to cure the curable material with a curing surface energy (E) (or light dose) that is lower than the Jacobs energy (Ej) defined for the curable material so as to induce a delay during the building/printing process (Paul F. Jacobs, *Fundamentals of stereolithography in International Solid Freeform Fabrication Symposium*, 1992). In that way, the conversion rates of the cured material (from a "gel state" to a "hardened state") forming the layers increase gradually through the successive low light dose exposures in the building process. In addition, the light dose is linked (Jacobs' equation) to a light depth penetration value within the curable material ($D_P$).

In general, so as to avoid layering-induced defects, the light depth penetration value $D_P$ used during the building process has a medium-large value, for example from about 10 times the thickness of a layer to about 50 or 100 times or more.

This solution is named hereafter the "building delay" and is notably described in the patent application EP 3 698 968.

Thus, on one hand, by increasing the accuracy of the printed curable material, the interfaces between layers (e.g. the interpenetration/merging between adjacent layers) are more marked, creating layering induced diffractive defects. On the other hand, the use of a large light depth penetration value ($D_P$) to smooth the layering induced defects, with a building delay method, implies that some curing energy can bleed out below the object to manufacture along much important thicknesses than without this technology. This may reduce the geometrical accuracy of the manufacturing process, which is especially important at the outline (periphery) of each layer during the building process of the manufactured optical device.

Indeed, by increasing the accuracy of a curable material, for example by reducing the height of the light depth penetration value (Dp), the light dose or curing surface energy (E) provided through the layer being hardened is less homogeneous within the layer due to high intrinsic absorption, leading to kinetics and monomer/oligomer conversion being less homogeneous through the layer and at interface, and, in turn the diffracting defects created are more marked. Similarly, by reducing the light scattering to have a better definition of the voxels shape, the difference of hardening between shadowed and lightened area is higher, causing diffracting defects to be more marked Therefore, optimizing the printing accuracy of the curable material reveals itself generally detrimental to the requirement of getting a homogeneous optical volume during the building process.

There is therefore a need to provide a new process of production of an optical article and especially of an ophthalmic lens that presents the desired geometry and preferably that does not has defects between layers.

Hence, one object of the disclosure is to provide a new process of production of an optical article and especially an ophthalmic lens that has the exact desired geometry (good accuracy of the printed material), while having a more homogeneous optical volume, preferably without diffracting defects between layers.

SUMMARY OF THE DISCLOSURE

The above object is achieved according to the disclosure by providing a method for the production of an optical element, such as an optical article and in particular an ophthalmic lens, from a curable material by using an additive manufacturing technology comprising:
  A—providing a curable material, with a predetermined layer thickness;
  B—curing said curable material inside sliced outlines (C1) whose geometry are determined according to the geometry of said optical element, said optical element comprising at least: a first volume element (V1) and a second volume element (V2), by
    forming the first volume element (V1) by irradiating the curable material with at least a first curing surface energy (E1) with a first light depth penetration value within the curable material (Dp1), and
    forming the second volume element (V2) by irradiating the curable material with at least a second curing surface energy (E2) with a second light depth penetration value within the curable material (Dp2),
    wherein said second light depth penetration value within the curable material (Dp2) is different from the first light depth penetration value within the curable material (Dp1).

Preferably, the curing step (B) comprises a multiplicity of curing steps that are repeated layer by layer with each sliced outline (C1) to manufacture said optical element.

In other words, the use of at least two different light depth penetration value within the curable material, that is to say a first light depth penetration value within the curable material (Dp1) and a second light depth penetration value within the curable material (Dp2), enables to easily manage both the constraints of printing accuracy during the building process and of getting a homogeneous optical volume.

In fact, the first light depth penetration value within the curable material (Dp1) may be predetermined for instance so as to be more compatible with a process for improving the printing accuracy (the printed voxels are close to the numerical expected voxels), whereas the second light depth penetration value within the curable material (Dp2) may be predetermined for instance so as to be more compatible with a method for improving the obtaining of a homogeneous optical volume, such as the building delay method described above.

For instance, in that case, on the one hand, the first light depth penetration (Dp1) may have a low value (such as 30 µm), for volume elements for which high precision is required. Such depth penetration may for example be used to form the voxels (or the first volume elements V1) at the periphery (also named hereafter the "skin") of the optical element or other voxels needing higher precision. The optical element thus obtained through this exemplary embodiment presents an accurate external geometry. On the other hand, the second light depth penetration (Dp2) may have a greater value than the first light depth penetration value (such as 500 µm) and may be used to form the voxels (or the second volume elements V2) inside (also named hereafter the "core") of the optical element. Therefore, the optical element thus obtained has a homogeneous optical volume (e.g. the interpenetration between adjacent layers during the building process, especially when the method of building delay such as described above is used, is well achieved).

It is to be noted that in that case, by controlling the thickness of the skin through the control of the first light penetration, it is possible to provide skin voxels which are not only precise but also harder than the voxels of the core at the time they are first formed in a layer. Indeed, by providing harder skin voxels, or more polymerized skin voxels, it is possible to have better mechanical and geometrical precision during manufacturing. However, such harder or more polymerized skin voxels lead, as mentioned above, to forming more variations of refractive index within the material, between two layers of skin and also within each layer or voxel of the skin. Thus, the use of the above embodiment, providing a more precise and thinner skin enable to localise these optical defects and makes it easier for those defects to less perceptible to the eye of a person that would wear eyeglasses with lenses manufactured in such way.

It is to be noted, that the first depth penetration value (Dp1) described above may be used to form more volume elements than the first volume elements (voxels) of the skin, for instance so as to create internal optical structures inside the ophthalmic lens, such as markings or light guides, holographic structures, etc.

In addition, the method according to the disclosure is compatible with any type of chemistry that is suitable for the formulation of the curable material (chain or step growth polymerization, etc.).

Moreover, the method according to the disclosure is also compatible with most of the known additive manufacturing technology devices using a polymerization process. According to the disclosure, in case of an unfilled curable material (resin) or the fill has no impact on the propagation of light, $D_P$ corresponds to the depth, within the material, calculated from the surface of the material, where 63% of light has been absorbed by the matter (37% is remaining).

The value can be determined according to the following methods. As example, the decadic attenuation coefficient ($A_{10}$) or Napierian attenuation coefficient of the resin (A) is measured at the wavelength using UV-visible spectroscopy analysis.

Then, Dp is obtained respectively as following:

$$Dp=1/(\ln 10 * A_{10}) \text{ or } Dp=1/A.$$

In some embodiments, Dp can be also expressed as compensated Dpc:

$$Dpc=1/(k*\ln 10*A_{10}) \text{ or } Dp=1/(k*A)$$

where k is a correction coefficient which can vary, as example, from 0.01 to 100. The Dp setting value can be different between the two irradiation wavelengths.

Other combinable features of the disclosure are:

the first light depth penetration value within the curable material (Dp1) is obtained by irradiating the curable material at the first wavelength ($\lambda 1$) and the second light depth penetration value within the curable material (Dp2) is obtained by irradiating the curable material at a second wavelength ($\lambda 2$);

it is noted that "irradiating at" the first wavelength ($\lambda 1$)" according to the disclosure means irradiating with a light having only the first wavelength or with a light having a light spectrum with non null intensity in a first wavelength range and having the first wavelength as a local maximum in intensity. In the same way, irradiating at "the second wavelength ($\lambda 2$)" according to the disclosure means irradiating with a light having only the second wavelength or with a light having a light spectrum with non null intensity in a second wavelength range and having the second wavelength as a local maximum in intensity. According to the disclosure, the at least one wavelength or wavelength range of the first wavelength ($\lambda 1$) are respectively different from the at least one wavelength or wavelength range of the second wavelength ($\lambda 2$);

hence, it is also noted that the "first light depth penetration value within the curable material (Dp1) is obtained by irradiating the curable material at the first wavelength ($\lambda 1$)" means that Dp1 may be obtained by irradiating at the first wavelength ($\lambda 1$) or at the first wavelength range or at a first polychromatic bundle of wavelength range that enables to obtain the first light depth penetration value within the curable material (Dp1); the same applies respectively, for the definition of the "second light depth penetration value within the curable material (Dp2) is obtained by irradiating the curable material at the second wavelength ($\lambda 2$)", in other words, the irradiation with the second wavelength ($\lambda 2$) provides a light depth penetration value within the curable material that is different from the irradiation with the first wavelength ($\lambda 1$);

the optical article is built by layer by layer and the difference between the second light depth penetration value within the curable material (Dp2) and the first light depth penetration value within the curable material (Dp1) is equal to or higher than an average layer thickness, that is preferably equal to or higher than at least three times the average layer thickness;

it is noted that the first volume element (V1) and the second volume element (V2) have a thickness of one layer (and not a thickness of Dp1 or Dp2, respectively); for the additive manufacturing technology which is the polymer jetting technology, "layer" means the ejected volume units in one pass (even at different height) within the optical element thus obtained;

according to the disclosure "an average layer thickness" means generally the mean layer thickness of "at least two consecutive layers, preferably of at least ten consecutive layers or optionally of at least ten consecutive layers comprising at least the first volume element(s) (V1) and the second volume element(s) (V2); in particular the wording "layer thickness" corresponds to the thickness added through mechanical means on the article during its manufacturing: it corresponds to the thickness of material added during the providing step, either through deposition of material or through displacing a support of the article-in-making from the surface of a bath of material, or other usual means;

the first volume element (V1) is situated into a first area (A1), that extends sensibly along said sliced outlines (C1), and the second volume element (V2) is situated into a second area (A2), said second area (A2) being mostly and preferably totally situated within the first area (A1), in other words, at least a part of the first area (A1) forms an envelope or a part of an envelope around the second area (A2);

it is to be noted that according to the disclosure, the term "area", such as the first area (A1) and the second area (A2), refers hereafter to volume and generally extends over multiple layers; in some cases, the wording ""n" area" may correspond to a cross section of the "n" area, in volume, with a given layer;

it is noted that "the second area being mostly within the first area" means in general that the first area (A1) surrounds the second area (A2) on about at least 80%, preferably at least 90%, preferably at least 95%, in particular at least 97% and typically at least 99% of the perimeter of the second area (A2);

in an embodiment, the first light depth penetration value within the curable material (Dp1) is strictly lower than the second light depth penetration value within the curable material (Dp2);

in an embodiment, the first volume element (V1) is more cured by the first curing surface energy (E1) than the second volume element (V2) is cured by the second curing surface energy (E2); this means that after being irradiated by the first curing surface energy (E1), the first volume element (V1) is more solid than the second volume element (V2) after being irradiated only by the second curing surface energy (E2);

according to the disclosure, the term "cured" and especially "more cured" may be determined by determining the conversion rate of the curable material in case of identical or similar materials, or measuring the viscosity, or using any other kind of resilience test, or preferably by using the SHORE A hardness test (for instance for soft material) or the SHORE D hardness test (for instance for hard material) such as defined in the standard EF EN ISO0868;

the curing surface energy (E1) applied to the first volume element (V1) is higher than or equal to a first predetermined energy threshold (T1), said first predetermined energy threshold (T1) being determined for the first volume element (V1) of a given layer by using the Jacobs' equation defined as $\{E_{J1}=E_{C1}*\exp(\text{th}1/D_{P1})\}$ at the first wavelength (λ1) with "$Ej_1$" a Jacobs energy necessary to polymerize a thickness th1 so that it becomes solid within the meaning of Jacobs, "$\text{th}_1$" the thickness of the layer containing the first volume element (V1), "$Dp_1$" the light depth penetration value within the curable material, and "$Ec_1$" a first critical Jacobs energy for the curable material (50)

and wherein said first predetermined energy threshold (T1) is higher than or equal to this critical Jacobs energy ($Ec_1$) or to this Jacobs energy ($Ej_1$);

the curing surface energy (E2) applied to the second volume element (V2) is strictly lower than a second predetermined energy threshold (T2), said second predetermined energy threshold (T2) being determined for the second volume element (V2) of a given layer by using the Jacobs' equation defined as $\{E_{J2}=E_{C2}*\exp(\text{th}_2/D_{P2})\}$ at the second wavelength (λ2) with "$Ej_2$" a Jacobs energy necessary to polymerize a thickness th2 so that it becomes solid within the meaning of Jacobs, "$\text{th}_2$" the thickness of the layer containing the second volume element (V2), "$Dp_2$" the light depth penetration value of the curing energy within the curable material, and "$Ec_2$" a second critical Jacobs energy for the curable material at the first irradiation wavelength, and wherein said second predetermined energy threshold (T2) is strictly lower than this Jacobs energy ($Ej_2$), preferably strictly lower than this critical Jacobs energy ($Ec_2$);

the second area (A2) also comprises a third volume element (V3) and a fourth volume element (V4), the third volume element (V3) is situated directly under a region of the first area (A1) (i.e.: in general under the sliced outline (C1) with regard to a direction of stacking layers of material), the fourth volume element (V4) is situated directly above a region of the first area (A1) (i.e.: in general above the sliced outline (C1) with regard to a direction of stacking layers of material), the third volume element (V3) being formed by curing the curable material at the second light depth penetration value (Dp2) with the second wavelength (λ2), preferably by applying a third curing surface energy (E3) that is higher than the second curing surface energy (E2), and in particular that is higher than the second critical Jacobs energy ($E_{C2}$); and/or the fourth volume element (V4) being formed by curing the curable material at a the second light depth penetration value (Dp2) with the second wavelength (λ2), preferably by applying a fourth curing surface energy (E4) that is lower than the second curing surface energy (E2); and/or the fourth volume element (V4) being formed by curing the curable material at the second light depth penetration value (Dp2) with the second wavelength (λ2) by applying a fourth curing surface energy (E4) that is smaller than the first curing surface energy (E1) or that hardens the fourth volume elements (V4) less than the first curing surface energy (E1) hardens the first volume element (V1);

in another embodiment, the second area (A2) also comprises a fourth volume element (V4), the fourth volume element (V4) is situated directly above a region of the first area (A1) (i.e.: in general above the sliced outline (C1) with regard to a direction of stacking layers of material), the fourth volume element (V4) being formed by curing the curable material with an intermediate light depth penetration value ($Dp_{int}$) which is ranging from the first light depth penetration value (Dp1) and the second light depth penetration value (Dp2), preferably by applying a fourth curing surface energy (E4) that hardens the fourth volume element (V4) less than the first curing surface energy (E1) hardens the first volume element (V1) and/or according to a further embodiment, the second area (A2) also comprises a third area (A3) situated directly above the first area (A1) (e.g. upstream according to the curing surface energy used to cure), said third area (A3) is formed of a lower portion that is the closest from the first area (A1) and an upper portion located directly above said lower portion, wherein the upper portion and the lower portion are formed by curing the curable material at a light depth penetration value that is intermediate between the first light depth penetration value (Dp1) and the second light depth penetration value (Dp2), preferably lower than the second light depth penetration value (Dp2), preferably the upper portion is formed by applying a curing surface energy that is lower than the curing surface energy applied to the lower portion;

the process comprises a further final step enabling a complete curing of both the curable material in the first area (A1) and the curable material in the second area (A2), and where appropriate, the curable material in the third area (A3);

the second area (A2) also comprises a third area (A3) situated directly above the first area (A1), wherein said third area (A3) is formed layer by layer by curing said curable material and being composed of at least two portions, said two portions considered from the first area (A1) to the second area (A2) being irradiated with a distinct DPs that increase; in general, said areas and said portions extending possibly across multiple layers;

the process comprises a prior step (S0) of:

determining at least part of an absorption spectrum of the curable material with regard to a determined wavelength range in the ultraviolet (200-450 nm), and/or in the visible light and/or in the near infrared (700-2500 nm), preferably within a range between 290 to 430 nm;

determining the corresponding light depth penetration values within the curable material as function of the wavelength for at least two different wavelengths, selecting at least the first wavelength (λ1) and the second wavelength (λ2) having respectively the first light depth penetration value (Dp1) and the second light depth penetration value (Dp2), the second light depth penetration value (Dp2) being different from the first light depth penetration value (Dp1), and determining the process based on the identified first light depth penetration value (Dp1) and the second light depth penetration value (Dp2).

It is considered that determining the transmission spectrums of the material may be an approximate equivalent to determining the absorption spectrum;

the process comprises a prior step (S0) of:

determining a composition of the curable material that enables to obtain the desired first light depth penetration value within the curable material (Dp1) by irradiating said curable material with the first wavelength (λ1) and the desired second light depth penetration value within the curable material (Dp2) by irradiating said curable material with the second wavelength (λ2), the values of the first and second wavelength being predetermined before said prior step; this embodiment may thus comprise a step of manufacturing or receiving a curable material with said determined composition;

according to this embodiment, the process comprises a prior step of providing of at least one irradiating device adapted to output at least two distinct wavelengths or wavelength ranges, of which one includes a first wavelength (λ1) and a second includes a second wavelength (λ2), wherein the stop of providing a curable material comprises:

providing an initial curable material composition and providing or determining an absorption spectrum of said initial curable material composition; or providing an absorption spectrum of said initial curable material composition;

providing a list of UV absorbers;

determining a selected list of UV absorbers and their concentration to add to the composition, so as to obtain a first light depth penetration value (Dp1) at the first wavelength (λ1) and the second light depth penetration value (Dp2) at the second wavelength (λ2);

providing the final curable material composition obtained by adding to said initial curable material the determined UV absorbers at their determined concentration.

wherein according to this embodiment, the first light depth penetration value within the curable material (Dp1) and second light depth penetration value within the curable material (Dp2) are determined to be within a first range of light depth penetration values for the first light depth penetration value (Dp1) and within a second range of light depth penetration values for the second light depth penetration value (Dp2), said first range and second range having at least one value determined in a previous step; this enables to lower the stress for the determination step, and is in particular useful if the calculation comprise multiple constraints such as more than two depth penetration values, or specific absorptions values at specific wavelengths, for example in the near-visible spectrum, etc.

the curable material is also adapted or configured to provide an optical article having:

a transmission in the blue light at a wavelength ranging from 420 to 450 nm higher than zero and higher or equal to 5% or more, preferably higher than or equal to 30 or even 50%, but lower than 80% or even 70%;

a transmission in the ultraviolet region at a wavelength ranging from 280 to 420 nm lower than or equal to 5%, preferably lower than or equal to 1%;

said optical element is an ophthalmic lens.

The disclosure also deals with a manufacturing system for manufacturing an optical element from a curable material using an additive manufacturing technology comprising:

a container suitable for containing a curable material, a support suitable for supporting the optical element to be formed, a forming unit suitable for curing said curable material at least inside a sliced outline (C1) whose geometry is determined according to the geometry of said optical element and that is able to use at least a first wavelength (λ1) and a second wavelength (λ2), and computer element (6) programmed to control said forming unit so as to apply at least a first curing surface energy (E1) with a first light depth penetration value of the curing energy within the curable material (Dp1) or with a first wavelength (λ1) and a second curing surface energy (E2) with a second light depth penetration value of the curing energy within the curable material (Dp2) or respectively with a second wavelength (λ2) onto the curable material, wherein said second light depth penetration value of the curing energy within the curable material (Dp2) is different from the first light depth penetration value of the curing energy within the curable material (Dp1), or respectively wherein the first wavelength (λ1) is different from the second wavelength (λ2).

DETAILED DESCRIPTION

The following description with reference to the accompanying drawings, given by way of non-limiting example makes it clear what the disclosure consists in and how it can be reduced to practice.

Figure 1:
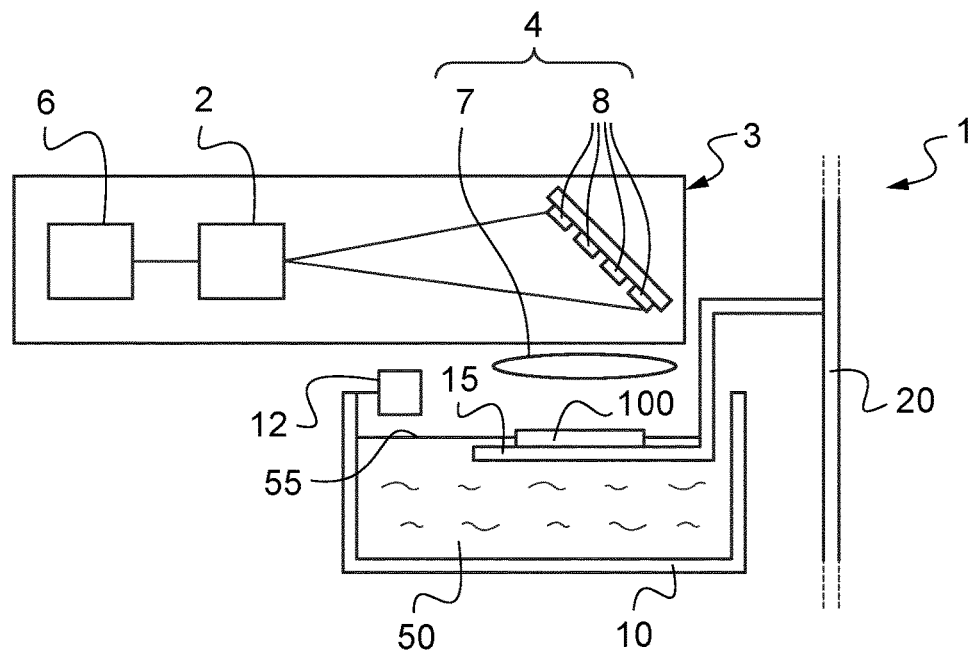
FIG. 1 represents an exemplary manufacturing system adapted to manufacture an optical element according to the disclosure.

Within this specification, the words "above" and "below" related to volume elements, areas, or layers are defined as following: "above" means upstream and "below" means downstream according to the direction of propagation of the curing energy used to cure the material during the manufacturing process.

The applicant strived to develop a new process of manufacturing of production of an optical article and especially an ophthalmic lens that has the exact desired geometry (good accuracy of the printed material), while having a homogeneous optical volume (e.g. without defects between layers).

For that purpose, the present disclosure relates to a method for the production of an optical element from a curable material by using an additive manufacturing technology comprising:

A—providing a curable material;
B—curing said curable material inside sliced outlines (C1) whose geometry are determined according to the geometry of said optical element, said optical element comprising at least: a first volume element V1 and a second volume element V2, by
  forming the first volume element V1 by irradiating the curable material with at least a first curing surface energy E1 with a first light depth penetration value within the curable material Dp1, and
  forming the second volume element V2 by irradiating the curable material with at least a second curing surface energy E2 with a second light depth penetration value within the curable material Dp2,
  wherein said second light depth penetration value within the curable material Dp2 is different from the first light depth penetration value within the curable material Dp1.

The present disclosure relates in general to a process adapted to manufacture an optical element using an additive manufacturing technology.

The disclosure applies more particularly to the manufacturing of all kinds of optical devices and elements, such as ophthalmic elements and devices. Non-limiting examples of ophthalmic elements include corrective and non-corrective lenses, including single vision or multi-vision lenses, which may be either segmented or non-segmented, such as multifocal lenses or progressive lenses, as well as other elements used to correct, protect, or enhance vision, and protective lenses or visors such as found in spectacles, glasses, goggles and helmets.

The optical article of the present disclosure is preferably a lens, and more preferably an ophthalmic lens an ophthalmic lens, for example suitable for being mounted in an eyeglass frame.

In the described embodiment hereafter of the present disclosure, the first volume element V1 is situated into a first area A1, that extends sensibly along said sliced outlines C1, and the second volume element V2 is situated into a second area A2, said second area A2 being mostly and preferably totally situated within the first area A1.

This means that the optical element comprises a "skin" mostly composed of the first volume element V1 and similarly made volume elements and a "core", disposed inside the skin, mostly composed of the second volume element V2 and similarly made volume elements. This described embodiment is named hereafter the skin/core embodiment and is notably described in the patent application EP 19305829.

It is noted that the disclosure is not narrowed to such embodiment. In particular, parts, or even most, of the external area could be composed of volumes elements made differently from the first element, for example it could comprise elements formed according to the second volume element, according to a third or fourth type of volume elements, or hybrids volume elements made with the depth penetration value of one of the volume elements but a curing surface energy of different value than the one applied to said volume element.

Preferably, the first light depth penetration value within the curable material Dp1 is obtained by irradiating the curable material at the first wavelength $\lambda 1$ and the second light depth penetration value within the curable material Dp2 is obtained by irradiating the curable material at a second wavelength $\lambda 2$.

In an embodiment, the first light depth penetration value within the curable material Dp1 is strictly lower than the second light depth penetration value within the curable material (Dp2).

Indeed, according to the described skin/core embodiment, a low Dp1 enables to improve the printing accuracy during the building process. Especially, combined with a specific value of the curing surface energy E1 (e.g. E1 is higher than the first critical Jacobs energy at $\lambda 1$), it enables to obtain an optical element having the desired external geometry, that is to say the printed volume elements V1 or voxels V1 are the closest as possible to the expected numerical volume elements or numerical voxels, in other words, the resolution in the x, y and z directions is good.

Generally, the light depth penetration value Dp1 is ranging from:

$$(th_{skin}/2) \leq Dp1 \leq (th_{skin}/0.4)$$

with "$th_{skin}$" is the thickness of one layer or one drop building the skin of the optical element. Typically, "$th_{skin}$" is around 10 μm, but in some cases it can measure up to 25 or 50 μm or 100 μm. Hence, for a layer thickness of about 10 μm the first light depth penetration value Dp1 may have a value that is generally lower than or equal to 50 μm, preferably, lower than or equal to 40 μm, and in particular lower than or equal to 35 μm and higher than or equal to 5 μm, preferably higher than or equal to 10 μm, and typically higher than or equal to 10 μm. Values of Dp1 may apply mutatis mutandis to other values of layer thickness, with about the same proportions; i.e.: generally lower than or equal to 5 $th_{skin}$, preferably lower than or equal to 4 $th_{skin}$, and most particularly comprised between 3.5 and 0.5 $th_{skin}$, or about 1 $th_{skin}$.

A medium-large Dp2 for forming the core of the optical element enables to get a homogeneous optical volume (no diffracting defects) during the building process, especially when the building delay method is used (e.g. the second curing surface energy E2 has a specific value that is below the critical Jacob energy at $\lambda 2$). In general, the light depth penetration value Dp2 is higher than or equal to 100 μm, preferably higher than or equal to 300 μm, and typically higher than or equal to 400 μm, such as 400 μm. Values of Dp2 may apply mutatis mutandis to other values of layer thickness, with about the same proportions; i.e.: generally higher than or equal to 10 $th_{skin}$, preferably higher than or equal to 30 $th_{skin}$, and most higher than 40 $th_{skin}$.

Before explaining in more details the process according to the disclosure, the additive manufacturing technology and the devices that are suitable to perform the process of the disclosure, and especially the described skin-core embodiment will be described hereafter.)

I °) The Additive Manufacturing Technology and Devices According to the Disclosure I.1—The Additive Manufacturing Technology The expression "additive manufacturing technology" refers to a manufacturing technology as defined in the International standard ASTM 2792-12, which mentions a process of joining materials to make objects from 3D model data, usually layer upon layer, as opposed to subtractive manufacturing methodologies, such as traditional machining. Solid objects are thus manufactured by juxtaposing volume elements (mainly layers or voxels or drops or droplets, or, in some case even blocks of matter). In the case of the present disclosure, the optical element will be described as being manufactured layer by layer but the disclosure is not narrowed to such an embodiment.

The additive manufacturing technology may be in practice stereolithography (SLA), digital light processing stereolithography (DLP-SLA), LED or L-COS stereolithography, or polymer jetting. Additive manufacturing technologies comprise processes which create objects by juxtaposition of volume elements according to a pre-determined arrangement that can be defined in a CAD (Computer Aided Design) file.

Stereolithography (SLA) and digital light processing stereolithography (DLP-SLA) both work by focusing an ultraviolet light onto a vat of photopolymer liquid resin in order to form solid layers that stack up to create a solid object. Regarding stereolithography (SLA), the liquid resin receives a selective exposure to light by a laser beam scanning the print area. As already explained above, the Digital light processing stereolithography (DLP-SLA) uses a digital projector screen to project an image of each layer across the entire surface of the resin. As the projector is a digital screen, the image of each layer is composed of square pixels, resulting in a layer formed from small rectangular bricks (voxels, e.g. volume defined by the square pixel and the thickness of the layer).

As an alternative, the pixels may have other shapes, such as being hexagonal, rhombus or elongated depending on using micro-mirrors or digital screens or other devices to modulate and generate the image of each layer, and on the properties of such device such as micro-mirrors shape, the use of LCD technology or the LED technology for the digital screen . . . etc.

A polymer jetting technology uses and inkjet print head to jet droplets of liquid photopolymer resin onto a build platform. The liquid resin is immediately cured by an ultraviolet lamp and solidified in order to build layers, or the final element, set of droplets by set of droplets (and form the solid object).

In the described embodiment, the digital light processing stereolithography will be preferred, but the disclosure is not narrowed to such an embodiment.

Hence, in practice here, the additive manufacturing technology used is based on the projection of an ultraviolet light pattern on a curable material. The light pattern is for example an infrared pattern or an ultraviolet pattern.

Especially, the additive manufacturing technology used is able to provide at least two different wavelengths, especially at least the first wavelength λ1 and the second wavelength λ2. Indeed, according to a characteristic of the disclosure, the irradiation of the curable material at the first wavelength λ1 enables to obtain a first light depth penetration value within the curable material Dp1 and the irradiation of the curable material at the second wavelength λ2 enables to obtain a second light depth penetration value within the curable material Dp2.

There are many additive manufacturing technology devices that are able to provide and select multiple wavelengths.

For instance, these devices may comprise:
a polychromatic source having all the wavelengths needed may be placed behind a passband filter selector;
a matrix of different emitting sources (like LED) may acts as one source; or
individual light sources that are collected into one source thanks to the use of an optical system;
two or more light sources (irradiation sources) having wavelengths of emission that are strictly different from each other, etc.

In order to respect the precision of the effective Dps (at least Dp 1 and Dp2), it is preferable that the light sources have an emission band as narrower as possible.

However, if the emission bands of the light sources overlap between two wavelengths, the wavelength difference in nm between the two light sources is increased until the precision of the Dps are acceptable. By emission band, it is meant the restricted range of wavelengths for which the emission intensity is higher than half the maximum emission intensity within the real whole emission band.

For instance, it may be the case for additive manufacturing technology using LEDs inside the process. Indeed, LEDs are not perfectly monochromatic and emit in range of wavelengths which may have not the desired absorption of the curable material, that is to say which does not enable to get the desired light depth penetration values Dps. To take in account this constraint, the wavelengths of each LEDs need to be spaced following their emission spectrum. For instance, the width at mid height of the emission band of a first LED at 365 nm is from 362 to 373 nm, so the second LED used could be parametered so as to have a wavelength of 376 nm having a width at mid height of the emission band from 373 to 385 nm and the third LED used could be parametered so as to have a wavelength of 392 nm having a width at mid height of the emission band from 388 to 400 nm. As the result, the different Dps may be set at different wavelengths which are 365 nm, 376 nm and 392 nm. In the present example, the wavelength of 365 nm may be used for forming the first volume element V1 situated in the first area A1 and correspond to the skin of the optical element, the wavelength of 392 nm may be used for forming the second volume element V2 situated in the second area A2 and correspond to the core of the optical element, and the wavelength of 376 nm may be used for forming another volume element situated between the first area A1 and the second area A2.

I.2—Example of One Manufacturing System According to the Disclosure and Adapted to Manufacture an Optical Element According to the Disclosure (FIG. 1)

FIG. 1 shows a manufacturing system 1 adapted to manufacture an optical element by way of a DLP-SLA process.

The manufacturing system comprises a forming unit 3, a container 10, a support and a shifting device 20 (here an actuator).

The forming unit 3 comprises an energy source 2 that is able to provide at least two different wavelengths (e.g. the first wavelength λ1, and the second wavelength λ2), an optical system 4, and a computer element 6. The forming unit 3 is adapted to implement a method for manufacturing an optical element 100 as described below when the instructions are executed.

In practice, the computer element 6 includes a microprocessor and a memory (not represented). The microprocessor is adapted to execute the instructions to manufacture the optical element 100 and the memory stores these instructions. As an example, the computer element 6 is programmed to generate instructions regarding the magnitude of at least a first curing surface energy (E1) and/or a second curing surface energy (E2) for each successive step of providing said first curing surface energy (E1) with the first wavelength λ1 (associated to light depth penetration value Dp1) and/or the second curing surface energy (E2) with the second wavelength λ2 (associated to the second light depth penetration value Dp2), and regarding image patterns, or light patterns, to be projected on the surface 55 of the curable material 50. These instructions are for example transmitted to the energy source 2 and/or to the optical system 4.

The energy source 2 is suitable for irradiating the surface 55 of the curable material 50 with the first curing surface energy (E1) and/or the second curing surface energy (E2). The energy source 2 provides a light beam, especially, an ultraviolet light beam, directed to the curable material 50 by the optical system 4. In particular, the energy source 2 enables to obtain at least the first light depth penetration value Dp1 by irradiating the curable material with the first curing surface energy E1 at the first wavelength λ1 and the second light depth penetration value Dp2 by irradiating the curable material with the second curing surface energy E2 at the second wavelength λ2.

The optical system 4 is adapted to project the light coming from the energy source 2 onto the surface 55 of the curable material 50 to form said image pattern. The imager 4 comprises a plurality of micro-mirrors 8 arranged into a grid format to redirect the light from the light beam toward the surface 55 of the curable material 50.

It is to be noted that other alternative combination of energy source and imager exist. For example, the formation of the image pattern may be generated entirely by the energy source, using a DLP having micro-mirrors or a digital screen, using LCD or LED pixels for example, and the imager only provides positioning and focusing effects; alternatively, the energy source may provide energy in a continuous or regular burst manner, and the imager generates the image pattern on top of positioning and focusing effect.

In practice, the micro-mirrors 8 are separated from each other by an interspace (indeed, it is not possible to have a perfect junction between two adjacent micro-mirrors); digital screens using LCD or LED pixels also bear such interspaces.

A micro-mirror 8 is for example in a sensibly square-shape, with a size of for example 8×8 μm². The interspace is comprised between 1 and 10 μm, for example around 2.8 μm, for a pitch between micro-mirrors of about 10.8 μm. Once projected onto the surface 55 of the curable material 50, the micro-mirrors may form projected pixels with a given pitch, comprising a direct projection of the micro-mirrors and of the interspace, for example the pitch may be of about 40×40 μm, with about 30×30 μm corresponding to a projection of the micro-mirrors, separated by an interspace of about 10 μm.

When the micro-mirrors 8 are illuminated by the light beam, they either reflect the light toward the surface 55 of the curable material 50 with a light intensity or do not reflect the light toward said surface 55 depending on an individual control of each micro-mirror. Consequently, the micro-mirrors 8 are adapted to draw a pattern on the surface 55 of the curable material 50, which pattern is pixelated (each pixel corresponds to a micro-mirror). Because the micro-mirrors 8 are separated from each other by an interspace, the projected pattern on the surface of the curable material 50 thus comprises some shadowed areas receiving less curing energy. Thus, the pixels on this projected pattern are separated from each other by an interpixel space. The material situated under these interpixel spaces is less polymerized than the other part of the material. In some cases it can even be under-polymerized or not polymerized.

In this specification, we will consider that the projected pattern is composed of square pixels, resulting in a layer formed from small rectangular bricks called voxels (volume defined by the square pixel and the thickness of the layer).

As visible in FIG. 1, the optical system 4 comprises here a projection system 7 adapted to direct the ultraviolet beam from the plurality of micro-mirrors 8 to the surface 55 of the curable material 50. Further, the size of the micro-mirrors or LCD or LED pixels or of the projected pixels may vary from the current example without disparaging from the disclosure.

The curable material 50 is stored in the container 10 in a liquid state. Once polymerized, the curable material 50 forms the optical element 100 which is born by the support 15. In practice, the support 15 is partly immersed in a vat of curable material 50 such that a portion of the liquid curable material 50 is on the top of the support 15. The light beam provided by the energy source 2 is thus projected on this portion of the curable material 50. When this portion is polymerized, the part of the optical element which is formed is thus on the support 15.

It is to be noted that the support may comprise support beams formed by cured curable material, built layer by layer at the same time as the optical device.

The manufacturing system 1 also comprises the shifting device 20. The shifting device 20 is suitable for shifting the support 15 on which the optical element 100 is formed with regard to the vat of curable material. This shifting device 20 allows a vertical movement of the support 15, relative to the vat of curable material, along an axis sensibly orthogonal to the surface 55 of the curable material 20. This vertical movement of the support 15 allows controlling the thickness of liquid curable material 50 to polymerize. The shifting device 20 thus allows controlling the thickness of the polymerized layer.

The shifting device 20 also allows, in the current example, a horizontal movement, along an axis sensibly parallel to the surface 55 of the curable material 50.

As represented in FIG. 1, the manufacturing system 1 comprises here a recoater device 12. This recoater device 12 is for example suitable for applying some curable material on the top of a previous layer of curable material. Alternative method do not use a recoater and may position a transparent window with or without membrane on the surface of curable material to achieve flatness of the material and controlling the thickness of curable material added on top of an previous layer of curable material. It is to be noted that the windows may be permeable to a polymerization inhibitor.

As explained hereunder, the manufacturing system 1 is programmed to product an optical element 100 from a curable material 50 by using an additive manufacturing process.

This optical element 100 advantageously comprises an ophthalmic lens. It may comprise only this ophthalmic lens. In a variant, it may comprise both an ophthalmic lens and a stabilizer that immobilize the lens on the support 15.

II °) The Process According to the Disclosure

Figure 2:
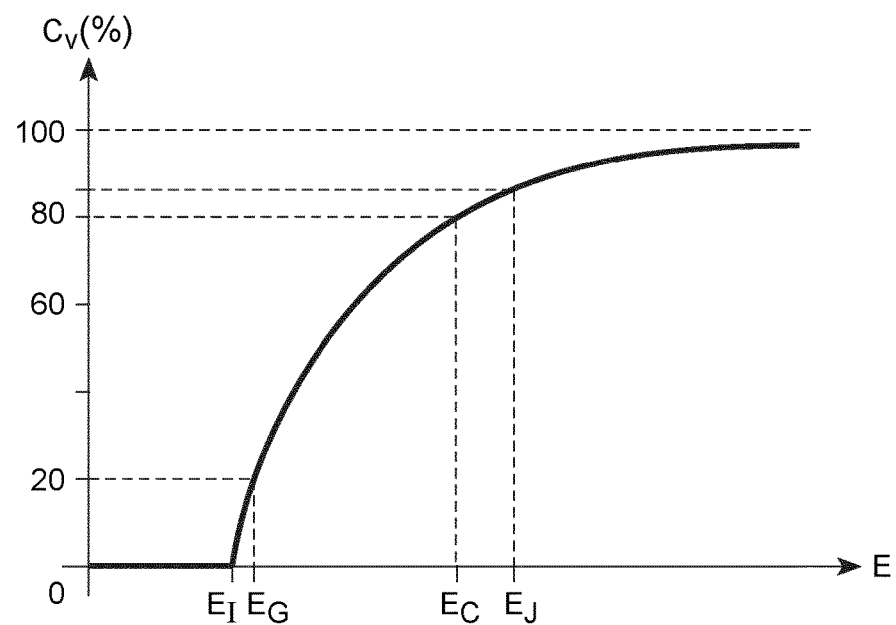
FIG. 2 represents a curve showing the conversion rate of a curable material as a function of the curing surface energy applied onto the surface of this material.

II.1—Providing a Curable Material (Step A) (FIG. 2)

As it has been discussed above, the method according to the disclosure requires the use of only one curable material having specific absorption properties so as to obtain at least the desired first light depth penetration value Dp1 and the desired second light depth penetration value Dp2, when it is irradiated respectively by the first irradiation wavelength λ1 or the second irradiation wavelength A2.

Especially, there are different methods of selecting and/or determining the appropriate curable material formulation according to the disclosure (prior step S0). These methods will be described hereafter.

In particular, the curable material suitable for the present disclosure comprises generally at least a photopolymer resin, at least one photoinitiator (so as to initiate the photopolymerization process) and preferably, at least one UV-blockers (or UV-absorber).

For instance, a photopolymer resin suitable for the present disclosure may have monomers, oligomers or polymerizable function be selected from one or more of the following compounds: alkene, alkyne, acrylate, methacrylate, cyanoacrylate, thiol, episulfide, isocyanate, isothiocyanate, oxetane, epoxy, acetoacetate, allylic ether, allylic carbonate, amine, imine, alcohol, vinyl sulfone, silanol.

The initiating system is able to directly or indirectly initiate a polymerization of monomers or oligomers or pre-polymers or a polymer chains having polymerizable functions. That is to say one or more chemical reaction systems which, following the absorption of a photon by a molecule, are able to generate and/or release and/or reorganize and/or transfer one or more chemical active species which can initiate a polymerization process. These chemical active species can be, for example, radicals and/or Lewis acids and/or Lewis bases and/or Brönsted acids and/or Brönsted bases.

In addition, the UV-blockers (or UV-absorbers) molecules suitable for the present invention are able to absorbing photons in the whole hardened or liquid system, and change the light depth profile according to its absorption properties. It can be conventional UV-absorbers or monomers, or photoinitiators or more generally, any compounds of the photopolymer resin having an active or passive absorption in the range of emission of light sources used to cure said photopolymer resin.

Preferably, the UV-blocker(s) used for the disclosure do(es) not absorb in the wavelength range 420-700 nm. This characteristic avoids an overlapping of the absorbing range with the visible spectrum and prevents a yellow color of the optical element formed during the manufacturing process of the disclosure.

Optionally, the curable material is also adapted or configured to provide an optical article having, for an optical article having a thickness of about 2 mm:
 a transmission in the blue light at a wavelength ranging from 420 to 450 nm higher than zero and higher or equal to 5% or more, preferably higher than or equal to 30 or even 50%, but lower than 80% or even 70%;
 a transmission in the ultraviolet region at a wavelength ranging from 280 to 420 nm lower than or equal to 5%, preferably lower than or equal to 1%.

Indeed, additional optical parameters of the optical element, such a protection against harmful blue light (wavelength ranging from 420 to 450 nm) may be derived from the composition of the curable materiel by adding the appropriate UV-absorbers.

In addition, the curable material may also comprise an optical brightener so as to decrease the yellowing of said optical element.

In addition, the curable material may also comprise "additives", such as deforming agents, viscosity modifiers, fillers, light stabilizers, leveling agents, wetting agents, etc.

II.2—The Photopolymerization Process

Especially, the optical element is manufactured from the curable material 50 by a photopolymerization process.

This photopolymerization process will be described hereafter so as to explain notably the "gel state" and the "hardened state" of the cured material 50.

In practice, the photopolymerization process can be characterized by a conversion rate $C_v$ (or polymerization rate) of the curable material 50. The conversion rate $C_v$ is linked to the physical state of matter of the curable material 50. Before being irradiated by the curable energy (here, E1 or E2), mostly irradiation by light, the curable material is liquid. The conversion rate $C_v$ is considered close to 0, notwithstanding a possible slight polymerization due to ageing of the curable material 50. Under the irradiation of the curable material 50 by the curable surface energy, the curable material 50 polymerizes and switches progressively from a liquid state to a solid state. The curable material is going through multiple states, especially an intermediate state, called "gel state", which corresponding conversion rate $C_v$ depends of the curable material. The intermediate state corresponds to a matter state which is neither liquid nor solid but between them, in particular, not solid enough according to the method according to the methodology of Jacobs (Paul F. Jacobs, *Fundamentals of stereolithography* in *International Solid Freeform Fabrication Symposium,* 1992), but with monomer having started to polymerize with each other, starting to form parts of a polymer network. The conversion rate $C_v$ of the intermediate state may for example be between 20% and 80% for some acrylate monomers, or higher than 10% and/or lower than 67% for some others. The curable material is considered to be in a solid state for a conversion rate $C_v$ generally higher than 80%. For some acrylate monomers, the curable material is considered to be in a solid state for a conversion rate $C_v$ higher than 67%. Depending on the material, the curable material is considered to be in a solid state for conversion rates higher than a critical conversion rate which may be empirically determined between about 40% to about 80%. In particular one way to ensure the solid state of a curable material may be by using the methodology of Jacobs mentioned above.

The conversion rates characterizing the intermediate state and the solid state may depend on a curing surface energy E or light dose (here, at least E1 and E2) derived from the light source (here, at least the first wavelength λ1 and the second wavelength λ2, respectively) received by the material, on the absorption properties of the curable material, on the physical properties of the material itself, and on the polymerization mechanism of the curable material. FIG. 2 represents the conversion rate $C_v$ (in %) as a function of the curing surface energy E which irradiates the curable material in the case of acrylate monomers.

As visible in this FIG. 2, in some cases, especially for radical chain growth polymerization, as long as the curing surface energy is lower than an induction surface energy $E_I$, the conversion rate remains close to 0. During this period (called the "induction period"), the curable material remains liquid and the polymerization does not occur.

In the case of a radical chain growth polymerization, the reaction between the primary radicals formed by activation of initiators and the monomers is quenched by an inhibitor (e.g. dioxygen), that reacts preferentially with said radicals thus preventing reacting with monomers. During the induction period, the curing surface energy E received by the curable material is thus used to consume the inhibitor. When the curing surface energy E received by the curable material reaches the induction surface energy $E_I$, the polymerization process occurs.

When the curing surface energy received by the curable material reaches the induction surface energy $E_I$, the polymerization process is initiated.

It is to be noted that some polymerization conditions or polymerization processes do not have an induction period, such as some cationic-chain growth polymerization. In such cases, the disclosure still applies, with an induction surface energy which is negligible.

As long as the total received curing surface energy remains lower than an intermediate surface energy $E_G$, the curable material remains in a liquid state but the polymerization process is occurring and the conversion rate $C_v$ increases (particularly with the beginning of the formation of polymer networks). In the example represented in FIG. 2, as the curable material is still in a liquid state, the conversion rate $C_v$ remains lower than 20% for acrylate monomers.

When the curing surface energy received by the curable material reaches the intermediate surface energy $E_G$, the curable material is considered as being in an intermediate state. In other words, it means that the curable material is between a hard and a liquid state. According to the *Compendium of Chemical Terminology* (also called the "IUPAC Gold Book" or more simply "Gold Book" by chemists), the intermediate surface energy $E_G$ is defined as the energy of incipient network formation in a polymerization process forming the polymer network.

As long as the total received curing surface energy remains lower than a Jacobs energy $E_J$, the curable material remains in the intermediate state, but the polymerization process is progressing and the conversion rate $C_v$ increases (with the conversion of monomers). The Jacobs energy $E_J$ is defined as the surface energy to provide to a given thickness of a curable material in order to form a measurable solid part of material. In other words, the Jacobs energy $E_J$ corresponds to the minimum surface energy to provide to polymerize the expected thickness with a minimum conversion rate empirically determined, for a given curable material, to be enough that the element is solid enough to be measured. Here, in the case of acrylate monomers, the corresponding conversion rate $C_v$ is around 60% to 80%. According to this range for the conversion rate, it is to be noted that there is no need to reach a total monomers conversion to get a polymerized material into the solid state.

The Jacobs energy $E_J$ is determined using an empirical method based on the Jacobs' equation:

$$th = D_P \cdot \exp\left(\frac{E}{E_C}\right),$$

with E the curing surface energy, $E_C$ the critical Jacobs energy, $D_P$ a light depth penetration value of the curing surface energy within the curable material and th the polymerized thickness considered along the path of the light rays carrying the energy. The light depth penetration value $D_P$ corresponds to the characteristic distance which is crossed by the ultraviolet light along said path before being absorbed with a predetermined rate. It is generally defined as the depth at which the intensity of the radiation inside the material falls to 1/e (about 37%) of its original value at (or more properly, just beneath) the surface. The critical Jacobs energy $E_C$ depends on the curable material.

The curing surface energy E is an average energy that can be expressed per surface unit (for instance per $m^2$).

The Jacobs' experiment is set to determine the critical Jacobs energy $E_C$. The Jacobs' experiment consists in irradiating a curable material (here a resin) with a set of known curing surface energies and measuring the corresponding polymerized thickness of measurably solid material. The Jacobs' experiment is adapted to determine the critical Jacobs energy $E_C$ and the light depth penetration value $D_P$ using these measurements of polymerized thicknesses (knowing the curing surface energy received by the curable material).

The Jacobs' experiment has notably been used as reference by the applicant to select and/or determine the suitable curable material according to the disclosure. The methods of selection and/or determination will be now described.

II.3—Selection and/or Determination of a Curable Material (Prior Step S0)

Especially, the different methods of selection and/or determination of a curable material described hereafter as been explained for the skin/core embodiment explained above (that is to say, Dp1 is used to form the periphery of the optical element, hereafter the skin and Dp2 is used to form the inside of the optical element, hereafter the core). In addition, the additive manufacturing technology and the device described at point I.2 and on FIG. 1 have been used to perform these methods.

Selection of a Curable Material (Known Formulation)

As it has been discussed above, the method according to the disclosure requires the use of one curable material having specific absorption properties so as to obtain the desired first light depth penetration value Dp1 and the desired second light depth penetration value Dp2.

According to a first method, the process according to the disclosure comprises a prior step (S0) of selecting, for a given curable material (for a given resin that is available on the market, that I to say without reformulation), the different wavelengths of irradiation that enables to obtain the desired Dp1 for the forming the skin of the optical element and the desired Dp2 for forming the core of the optical element. In other words, the wavelengths that may be used to obtain the desired Dp1 and Dp2 are determined from the absorptions properties of the given resin, which naturally varied depending on its composition (species which absorb).

The given resin may be the resins commercialized or stock resin. These resins are photocurable or partially photocurable.

For instance, the applicant has performed a set of experiments to determine the light depth penetration value Dp at different wavelength for a stock resin having the following composition.

| Compounds | Part |
|---|---|
| OMNIRAD TPO | 1.000% |
| ESOLEX 9020 | 0.062% |
| ACRYLATE MONOMERS | 98.938% |

The following results have been obtained (the Ec were not determined for each wavelength value):

| Wavelength (nm) | Dp (μm) | Ec (mJ) |
|---|---|---|
| 365 | 50 | 8 |
| 370 | 56 | — |
| 375 | 61 | — |
| 380 | 64 | — |
| 385 | 80 | 7.6 |
| 390 | 132 | — |
| 395 | 212 | — |
| 400 | 287 | 12.6 |

Here, for the skin/core embodiment, the applicant preferably selected a lower Dp for defining Dp1 that enables to form the skin of the optical element and a larger Dp for defining Dp2 that enables to form the core of the optical element. As mentioned above, Dp1 is chosen so as to be a "short Dp", and may thus be ranging from: $(th/2) \leq Dp1 \leq (th/0.4)$ with "th" is the thickness of one layer or one drop building the skin of the optical element. Typically, in the examples, "th" is around 50 μm. Hence, Dp1 would be ranging between 25 μm and 125 μm. Dp2 is chosen so as to be a deeper DP and may thus be chosen to be around 300 μm. Therefore, for the example resin, in view of the examples values of Dp, $\lambda 1$ is chosen to be 365 nm and $\lambda 2$ is chosen to be 400 nm.

According to a second method, the process according to the disclosure comprises a prior step (S0) of:
 determining at least part of an absorption spectrum of the curable material 50 with regard to a determined wavelength range in the ultraviolet (200-450 nm), and/or in the visible light and/or in the near infrared (700-2500 nm), preferably within a range between 290 to 430 nm;
 determining the corresponding light depth penetration values within the curable material as function of the wavelength for at least two different wavelengths,
 selecting at least the first wavelength $\lambda 1$ and the second wavelength $\lambda 2$ having respectively the first light depth penetration value Dp1 and the second light depth penetration value Dp2, the second light depth penetration value Dp2 being different from the first light depth penetration value Dp1, and
 determining the process based on the identified first light depth penetration value (Dp1) and the second light depth penetration value (Dp2).

This second method is quicker than the above-mentioned first method.

Indeed, for this second method, the absorption of the curable material 50 has been measured according to the wavelength, for instance by UV-spectroscopy. Then the absorption spectrum has been converted to Dp as function of the wavelength according to the equation:

$$A_{10}(mm^{-1}) = 1/(\ln 10 \times Dp).$$

For instance, the experiment has been performed for the given stock resin. It has been determined that for obtaining the desired Dp1 (ranging from 25 μm to 125 μm), a wavelength of 365 nm (50 μm), 370 nm (56 μm) or 375 nm (61 μm) is appropriate and for obtaining the desired Dp2 (around 300 μm) a wavelength of 400 nm is appropriate.

Figure 3:
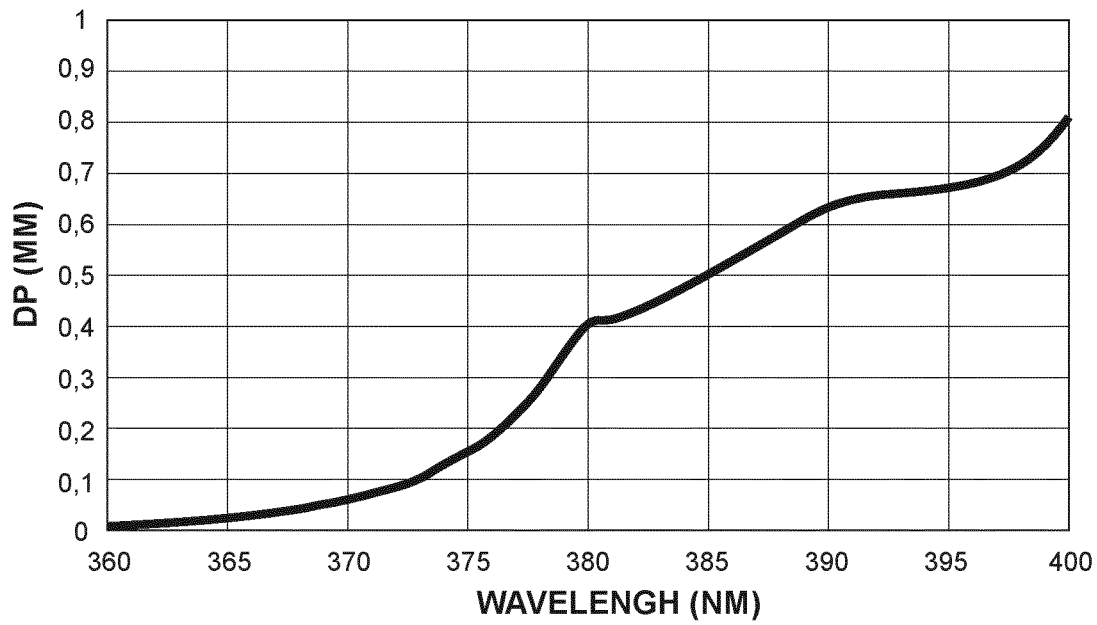
FIG. 3 represents the light depth penetration value (Dp) in mm within the curable material as function of the wavelength (nm) of the curable material formulation of example 1.
Figure 4:
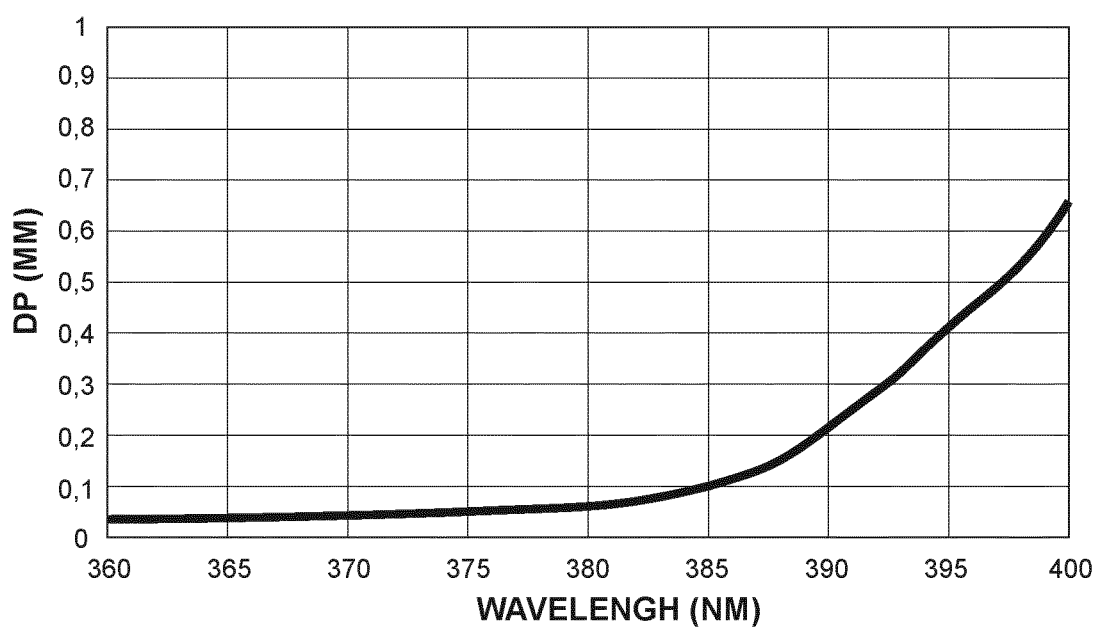
FIG. 4 represents the light depth penetration value (Dp) in mm within the curable material as function of the wavelength (nm) of the curable material formulation of example 2.
Figure 5:
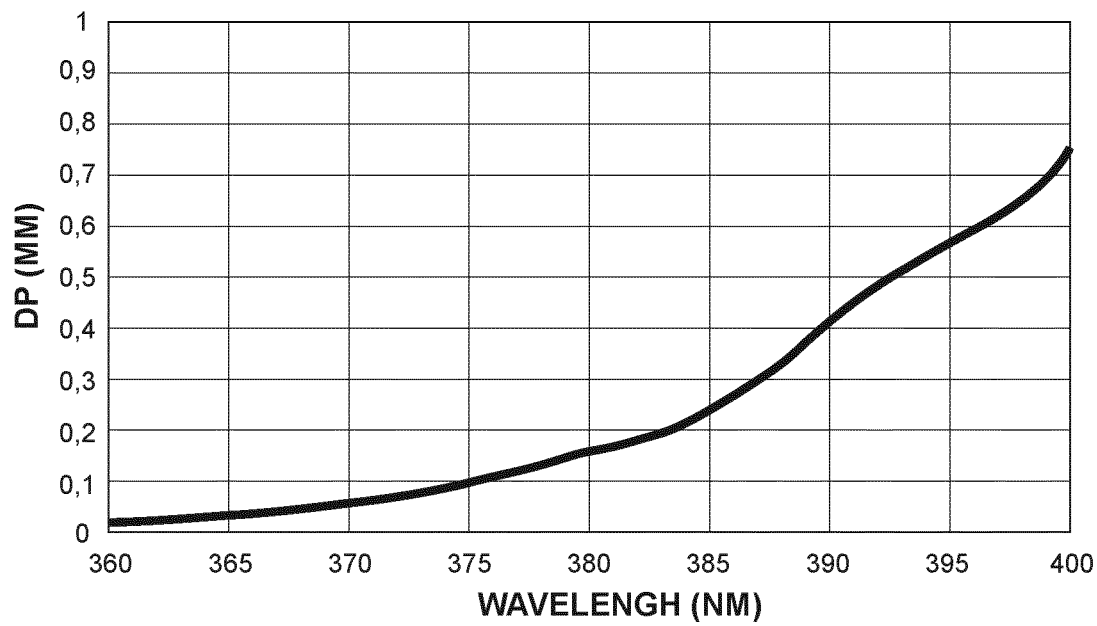
FIG. 5 represents the light depth penetration value (Dp) in mm within the curable material as function of the wavelength (nm) of the curable material formulation of example 3.

Determination of the Formulation of the Curable Material (Examples 1 to 3 and FIG. 3 to 5)

According to another method according to the disclosure, the process may comprise a prior step wherein the formulation of the curable material 50 does not correspond to a given resin, but is determined by a computer element so as obtained the desired light depth penetration values Dp1 and Dp2 and other beneficial requirements.

For this method, the process according to the disclosure comprises a prior step (S0) of:
 (i) determining a composition of the curable material that enables to obtain the desired first light depth penetration value within the curable material (Dp1) by irradiating said curable material with the first wavelength ($\lambda 1$) and the desired second light depth penetration value within the curable material (Dp2) by irradiating said curable material with the second wavelength ($\lambda 2$), the values of the first and second wavelength being predetermined before said prior step; this embodiment may thus comprise a step of manufacturing or receiving a curable material with said determined composition.

Preferably, for step (i) of this method, the process comprises a prior step of providing of at least one irradiating device adapted to output at least two distinct wavelengths or wavelength ranges, of which one includes a first wavelength ($\lambda 1$) and a second includes a second wavelength ($\lambda 2$), wherein the step of providing a curable material comprises:
 providing an initial curable material composition and providing or determining an absorption spectrum of said initial curable material composition; or
 providing an absorption spectrum of said initial curable material composition;
 providing a list of UV absorbers;
 determining a selected list of UV absorbers and their concentration to add to the composition, so as to obtain a first light depth penetration value (Dp1) at the first wavelength ($\lambda 1$) and the second light depth penetration value (Dp2) at the second wavelength ($\lambda 2$);
 providing the final curable material composition obtained by adding to said initial curable material the determined UV absorbers at their determined concentration.

Said prior step may be computer implemented.

In an embodiment, the first light depth penetration value within the curable material Dp1 and second light depth penetration value within the curable material Dp2 are determined to be within a first range of light depth penetration values for the first light depth penetration value Dp1 and within a second range of light depth penetration values for the second light depth penetration value Dp2, said first range and second range having at least one value determined in a previous step. This enables to ease the burden on a computer implemented method such as a method of constrained optimization.

Especially, the applicant has developed a method that enables to establish the appropriate formulation of the curable material/resin according to some specifics constraints. These constraints have been themselves established so as to provide an optical article having the desired geometry and that does not has defects between layers.

In an embodiment, these constraints are as follows:

1) the desired Dp1 has been determined so as to obtain an accurate printing of the external geometry of the optical element (in general around 30 µm);
2) the desired Dp2 has been determined for obtaining a good interpenetration between adjacent layers during the building and to avoid diffracting defects (in general around 500 µm);
3) optionally, the photoinitiator(s) and the UV-blocker(s) do not absorb for wavelength greater than 400 nm to limit overlapping with UV-Visible spectrum and to prevent a yellow color of the optical element (e.g. the transmission at 400 nm would be higher than 95%);
4) the irradiation wavelengths available (for the experiments) are 365 nm and 385 nm or 365 nm and 395 nm.

The method may thus determine, based on a set of constraints, at least one list of UV-absorbers to add to the composition and their concentration. The UV absorbers may be chosen from a list of UV-absorbers.

In some case, it is possible that the selected reaction initiator, such as the photoinitiators, does not absorb for all the used wavelengths (constraint 4) or has not a good enough reactivity to initiate polymerization at such wavelengths. In this case, it is possible to switch initiator for one with a broader absorption range or add a co-initiator, to photosensitize the initiator, or to add another photoinitiator. Indeed it might be useful to have a blend of photoinitiators which have a good enough reactivity and absorbance for each of the wavelengths of the invention. Preferably, the composition comprises at least one photoinitiator which has enough reactivity so as to be able to absorb at, at least, two different wavelength of the process according to the disclosure.

In other words, in a preferred embodiment, applicable to any of the embodiments in the disclosure, the process of the disclosure is applied using at least two Dp, through the use of providing at least two curing surface energy having different wavelength, at least two of the wavelength used enabling a same kind of photoinitiator to initiate polymerization of the monomers. In other words, preferably, at least two wavelengths are used to initiate a same type of polymerization with two different depth penetration values.

It has been found that most often the light absorbing compounds (e.g. UV-blockers, photoinitiators, optical brighteners . . . etc.) tend to have a higher absorption in deeper UV. This feature matches to have a small Dp that may correspond to Dp1 so as to form the skin of the optical element. Thus, the first wavelength λ1 may correspond to 365 nm and may be dedicated for the "printing accuracy". It has also been found that most of light absorbing compounds (e.g. UV-blockers, photoinitiators, optical brighteners . . . etc.) tend to have a lower absorption near to UV-visible frontier. This feature matches to have a medium-large Dp that may correspond to Dp2 so as to form the core of the optical element. Thus, the second wavelength λ2 may correspond to 385 nm or 395 nm and may be dedicated for "building delay method". It is noted that it is possible, on the contrary, to have a large Dp at 365 nm and a low Dp at 395 nm.

These constraints and the formulation of an initial curable material composition (input data) have been introduced into a computer element adapted to or configured to analyze these input data and to generate the suitable final curable material formulation (output data).

The following equations have been used:

$$\begin{cases} \sum_{i=1}^{n} \varepsilon_{i\ 365\ nm} x_i = \dfrac{1}{\ln 10 * Dp_{365\ nm}} \\ \sum_{i=1}^{n} \varepsilon_{i\ 385/395\ nm} x_i = \dfrac{1}{\ln 10 * Dp_{385/395\ nm}} \quad \text{with } x_i \geq 0 \\ \sum_{i=1}^{n} \varepsilon_{i\ 400\ nm} x_i = \dfrac{1}{\ln 10 * Dp_{400\ nm}} \end{cases}$$

where, $\varepsilon_{i\ XXXnm}$ is the molar absorption coefficient of the compound i at XXX nm (L/mol/cm).

$x_i$ is the molar concentration of the compound i (mol/L).

$Dp_{YYYnm}$ is the light depth penetration at YYY nm ( )

n is the total number of absorbing compounds considerate for the calculation.

The examples 1 to 5 described below illustrate this method of determining the curable formulation thanks to the use of the computer element and the above-mentioned equations.

II.4—Curing Step (Step B of the Process)

Once the suitable curable material has been selected and/or determined, the process comprises a first step of acquiring the 3D geometry of the optical element 100, here the ophthalmic lens.

Then, this 3D geometry is divided into volume units. Because the considered manufacturing system 1 is a DLP-SLA device, this 3D geometry is sliced into several layers of the same thickness ("th"), which might themselves be composed of voxels, or pixels.

Figure 6A:
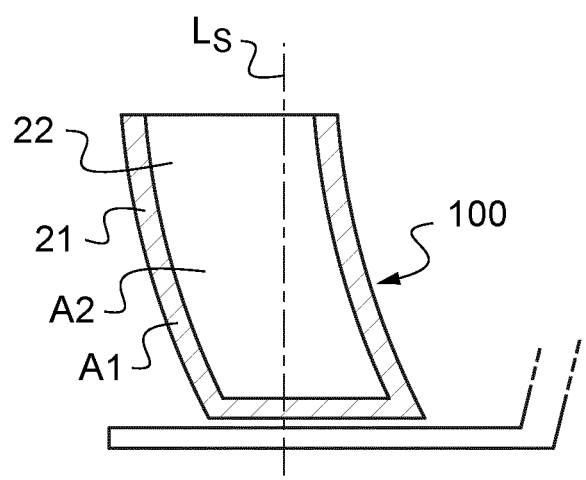
FIG. 6A represents a side view of a part of an optical element to be manufactured according to the disclosure.
Figure 6B:
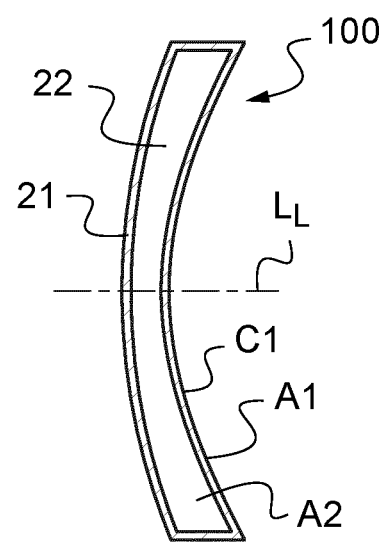
FIG. 6B represents a top view of the part of the optical element represented in FIG. 6A.

As shown in FIGS. 6A and 6B, here, the layers are superimposed along an axis $L_S$ roughly orthogonal to an optical axis $L_L$ of this ophthalmic lens (this optical axis $L_L$ being for instance, in the case of a monofocal lens, an axis along which the light is not deviated when it passes through the lens). This example illustrates also by inference the case where the axis $L_S$ of superimposition is tilted from more than 45 degrees relative to this optical axis $L_L$. The disclosure may also apply to layer superimposed along an axis having a non-orthogonal angle with the optical axis or even parallel to said optical axis.

It is to be noted that the disclosure also apply in particular when the axis $L_S$ of superimposition is tilted from more than 45 degrees relative to this optical axis $L_L$.

The intersection between the mean plane of each layer and the external 3D contour of the optical element 100 defines a sliced outline C1. This sliced outline C1 thus extends in a 2 dimensional plane. It is to be noted that in the particular example, the sliced outline C1 corresponds to an outline of the solid part of the device to be manufactured, for example the optical element 100. In some cases, the sliced outline may also comprise parts that are to be manufactured but that won't need to be in the end form of the device (support part to be removed, partially cured portions, etc.).

It is to be noted that in most embodiments the slicing mentioned with regard to the sliced outlines corresponds to the slicing into the layers for the manufacturing step.

Then, the process comprises a multiplicity of curing steps for curing (i.e. hardening) the curable material 50 layer by layer, inside each sliced outlines C1, by applying at least:

the first curing surface energy E1 onto part of the surface 55 of the curable material 50 with the first light depth penetration value within the curable material Dp1 and especially at a first wavelength λ1, and/or the second curing surface energy E2 onto part of the surface 55 of the curable material 50 with the first light depth penetration value within the curable material Dp2 and especially at a first wavelength λ2 so as to form the second volume elements V2.

To this end, each layer is irradiated one after the other with the corresponding irradiation parameters E1, Dp1 and λ1 so as to form the first volume elements V1 and/or E2, Dp2 and λ2 so as to form the second volume elements V2.

It is noted that so as to form the different surface areas (at least A1, A2, etc.) of the ophthalmic lens, the irradiations may be occurred simultaneously or not (depending of the predetermined pattern or of the available source(s) of curing energy). Therefore, the irradiation of the first volume element V1 is initiated by the first surface curing surface energy E1 at λ1 and the irradiation of the second volume element V2 is initiated by the second surface curing surface energy E2 at λ2. Hence, if the irradiations of λ1 and λ2 are not simultaneous, the irradiation of λ2 will not lead to initiate the curing of the first volume element V1 (but it may optionally, continue the curing of the first volume element V1 if that element had its curing already initiated) and respectively, the irradiation of λ1 will not lead to initiate the curing of the second volume element V2 (but it may optionally continue the curing of the second volume element V2, which curing had already initiated). In that case, the first volume element V1 and the second volume curing element are either disposed in two different layers or are in the same layer and one the irradiations pattern overlaps with the predetermined pattern of the other irradiation. If the irradiations of λ1 and λ2 are simultaneous, the irradiations of λ1 may irradiates a part of the second volume element V2 and respectively, the irradiations of λ2 may irradiates a part of the first volume element V1. In that case, the volumes elements V1 and V2 are in the same layer.

Between the forming of two layers, the support is submerged by a depth equal to the layer thickness of a next layer and the recoater device 12 might be used for spreading the curable material 50 on the top of the last formed layer and homogenising its thickness.

Preferably, the first volume element V1 is situated into a first area A1 (e.g. skin), that extends sensibly along said sliced outlines C1, i.e., along the parts of the sliced layers corresponding to the contour of the 3D element, and the second volume element V2 is situated into a second area A2 (e.g. core), said second area A2 being mostly and preferably totally situated within the first area A1. In fact, the second area A2 is sensibly enclosed by the first area A1, for example forming what is intended to become the core of the body of the final device to manufacture.

It is to be noted that in the case where the solid envelop of the final device comprise an internal cavity, or that the slicing of the device shape forms an apparent cavity for a layer, the sliced outline may comprise one or more external outline and one or more internal outline. Accordingly, the first area may extend sensibly along the external outlines and along the possible internal outlines. Further, the second area would be present so as to be enclosed by the first area, between an external outline and a corresponding internal outline.

In general and especially for the skin/core embodiment, the first light depth penetration value within the curable material Dp1 is strictly lower than the second light depth penetration value within the curable material Dp2.

In particular, the difference between the second light depth penetration value within the curable material Dp2 and the first light depth penetration value within the curable material Dp1 is equal to or higher than an average layer thickness, in an embodiment it is preferably equal to or higher than at least three times the average layer thickness.

This energy repartition, using a type of depth penetration for a skin part of the optical element and another depth penetration for a core part of the optical element, and using both types within a same layer, is preferentially used to cure most of the layers of the optical element 100. In practice, it may be used to cure the entire optical element 100, with the possible exclusion of the bottom and/or the top of this element (see FIG. 5A), where a skin part might be needed on the whole part of the layer within the sliced outline C1 (for one or more layers).

Preferably, the curing step, and thus the forming of the whole optical element, is performed by using the building delay method briefly disclosed above and that will be described in more details hereafter.

To sum up, for forming an optical element with the building delay method the material is cured in multiple steps, such that for most layers, most of the material destined to be hardened at the end of the additive manufacturing process in a non-solid state when an overlapping layer of material is formed or deposited onto it. According to a simplified explanation, it can be considered that this enables to let the material reorganize during hardening with the material of other layers in such a manner that the layers mix with each other.

In other words, at least the second area A2 of each of these layers is only partially cured and not solid before being covered by a new layer of curable material 50. More precisely, before being covered by a new layer, a given layer is cured so that it has a core 22 (the second area A2) in an intermediate or nearly-liquid state (preferably in an intermediate state), and a skin 21 (the first area A1) in a more polymerized state such as a solid state. By intermediate state it is meant within the specification a state where polymerization has initiated, a first part of a polymer network is formed but the material is not solid enough to be measured according to the Jacobs' methodology.

Alternatively before being covered by a new layer, a given layer is cured so that it has a core 22 (the second area A2) in an intermediate or nearly liquid state (preferably in an intermediate state) and a skin 21 (the first area A1) in also an intermediate state with a conversion rate higher than the one of the core 22, for example approaching a conversion rate corresponding to having received the first Jacobs energy $E_{J1}$ at λ1, or at least the critical Jacobs energy Ec1 at λ1.

Thanks to the disclosure, when more curable material 50 is added on the last formed layer while the core 22 is still in a intermediate state and susceptible to external stress and damage, such as could be received from a recoater device 12, the skin 21 is polymerized enough to maintain its shape, so that the skin 21 can maintain the shape of the core 22.

Hence, applied to the skin/core embodiment, the first volume element V1 forming the first area A1 (e.g. skin) is more cured by the first curing surface energy E1 than the second volume element V2 forming the second area A2 (e.g. core) is cured by the second curing surface energy E2. As mentioned above, this characteristic may be measured for instance with the Jacob's experiments.

It is to be noted that the curing surface energy E1 and E2, needed to have the curable material reach the state of matter mentioned above, depends on the used wavelength (here, the first wavelength λ1 and the second wavelength λ2, respectively) and therefore the intensity of E1 and E2 could not be compared. Indeed, as the two wavelength used are different, with different absorption by the material, and triggering different reactivity of the photoinitiator, for some combination of material and wavelengths it is possible that the volume V1 is more polymerized, or has a greater conversion, than the volume element V2 despite E1 being smaller than E2.

Hence, this characteristic enables to obtain a skin of the optical element that is in a harder state as compared to the core and enables to improve the geometry of the outline of each layer during the manufacturing of the layers situated onto this layer. In addition, the layers thus obtained are at an appropriate mechanical strength and are not therefore easily damaged by mechanical stresses, such as could be imparted by the use of the recoater device 12 or during separation from a leveling membrane/window in case such window or membrane is used. Hence, the geometry of the outline of the manufactured ophthalmic lens is improved.

Especially, in an embodiment, the curing surface energy E1 applied to the first volume element V1 is higher than or equal to a first predetermined energy threshold T1, said first predetermined energy threshold T1 being determined for the first volume element V1) of a given layer by using the Jacobs' equation defined as $\{E_{J1}=E_{C1}*\exp(th1/D_{P1})\}$ at the first wavelength ($\lambda$1) with "$Ej_1$" the Jacobs energy, "$th_1$" the thickness of the layer containing the first volume element V1, "$Dp_1$" the light depth penetration value within the curable material 50, and "$Ec_1$" the first critical Jacobs energy of the curable material 50.

In such case, said first predetermined energy threshold T1 applied to form the first area A1 or the skin of the optical element is higher than or equal to this critical Jacobs energy $Ec_1$ or to this Jacobs energy $Ej_1$. In some embodiments the first predetermined energy threshold T1 applied to form the first area A1 or the skin of the optical element is lower than or equal to this critical Jacobs energy $Ec_1$ or to this Jacobs energy $Ej_1$ but is determined so as to provide a conversion rate greater than the one reached for the second volume element V2.

In addition, the curing surface energy E2 applied to the second volume element V2 is strictly lower than a second predetermined energy threshold T2, said second predetermined energy threshold T2 being determined for the second volume element V2 of a given layer by using the Jacobs' equation defined as $\{E_{J2}=E_{C2}*\exp(th2/D_{P2})\}$ at the second wavelength $\lambda$2 with "$Ej_2$" the Jacobs energy, "$th_2$" the thickness of the layer containing the second volume element (V2), "$Dp_2$" the light depth penetration value of the curing energy within the curable material, and "$Ec_2$" the second critical Jacobs energy defined for the curable material 50.

Generally, said second predetermined energy threshold T2 applied to form the second area A2 or the core of the optical element is strictly lower than this Jacobs energy $Ej_2$, preferably strictly lower than the critical Jacobs energy $Ec_2$.

As it will be explained in more details hereafter, some of the layers of the optical element 100 may comprise more than two different areas A1, A2, polymerized differently to ensure different functions.

Before explaining how the skin 21 and these other areas are cured, we can give an example of polymerization of the core 22, to understand why the core of a layer is still in an intermediate state when a new layer of curable material is delivered onto this layer.

To this end, we can take into consideration a layer that is situated at a distance from the bottom and the top of the optical element.

The second curing surface energy E2 used to polymerize the core 22 at the second wavelength of this considered layer is strictly lower than a second predetermined energy threshold T2 that is itself strictly lower than the second critical Jacobs energy $E_{C2}$.

During the curing (building process), the set of pixels projected on the surface 55 of the curable material 50 to form the core 22 are separated from each other by an interpixel space. Consequently, the core 22 comprises an alternating of intermediate state zones (that were directly irradiated and for which the polymerization is occurring) and of less polymerized zones.

According to some embodiments of the disclosure, all these zones can be further polymerized in later steps, either during another irradiation of the considered layer or most often during the irradiation of one or several other layers placed on the considered layer. These irradiations are preferentially performed in such a manner that the end polymerization rate of all these zones will not be very different.

In this described embodiment, we will consider that a single irradiation is directly applied on each layer in the core area, even though the disclosure applies even if multiple irradiations are directly applied to each layer (or at least some layers).

Each second curing surface energy E2 applied to the surface of the curable material 50 for a second volume element V2 is determined as a function of the second depth penetration value Dp2 of the curable energy within the curable material, thus taking into account the light absorption of the curable material 50. In other words, each surface energy E2 needs to be sufficient to go through several layers in order to enable to polymerize the material of the layers situated under the last formed layer, for example at least until it becomes solid, or even until this material is almost fully converted. The control of the depth penetration, obtained by choosing a process leading to a given depth penetration, thus enables that the material of the layers of the core area reach such solid or almost fully converted states only after being recovered by a determined number of layers, each layer being submitted to a second curing surface energy E2 as defined above.

In an embodiment, in order to treat the shadowed zones, before irradiating the liquid curable material 50 of a new layer with a new pixelated pattern, the manufacturing system 1 is adjusted in such a way that the pixels of this pattern cover part of the shadowed areas of the last formed layer. In practice, to this end, the support 15 is shifted along an axis sensibly parallel to the surface of the curable material (named the "pixel moving"). According to an alternative easier to operate, the optical system 4 is controlled so as to shift the projection of the pattern onto the vat of material, for example by a value smaller than a pixel's dimension.

In this example, due to the transmission of the second curing surface energy E2 through the different layers (in the second area A2), the considered layer is eventually fully polymerized because the sum of the curing surface energies it receives directly and especially indirectly (through other layers) is higher than or equal to the second critical Jacobs energy Ec2, and can even approach the energy necessary to have it almost fully converted.

It is to be noted, that the disclosure may also apply to some parts of the second area (or a fourth area if any) designed to finish the additive manufacturing process while being in intermediate state or while having received barely enough energy to reach the Jacobs energy. In those cases, the device is designed such that after the additive manufacturing process, the skin, which is solid, and/or further solid parts of the device (such as fifth areas or parts of the second area) are sufficient, in hardness and amount, to maintain the geometry and potentially manipulate the device. Thereafter, the device undergoes a final curing step to finalize the hardening of all the parts of the device. As explained hereafter, the final curing step may for example be an UV-oven-curing step, and/or a thermal curing step if the material is adapted to such curing process.

The advantage of building the core area(s) according to this method is that the curable material in the core 22 of the optical element 100 is polymerized in steps that allows the monomers to cross polymerize between the different layers so as to form an sensibly homogeneous material (which reduces the defects), at least along the axis of layering, thanks to the light dose distribution control. This characterization thus increases the optical quality of the lens.

In more details, within the parts corresponding to the core area(s), the curable material of the superimposed layers polymerizes in such a manner that the material of the layers react with each other (which reduces the defects) thanks to a merging process between layers which occurs while being in the intermediate state of matter. To obtain this result, the light dose distribution needs to be highly controlled. In particular, the lower the variation of state of matter joining adjacent layers, the less defects.

Using this embodiment of the disclosure for the core area thus increases the optical quality with regard to the optical defects related to the use of the superposition of layers of material. Indeed, it has been noted that in the prior art, the formation of an optical device with a stacking of a multiplicity of layers induces a repetition of a pattern, formed by a variation of optical properties between the interface with a previous layer and the interface with a following layer. Indeed, according to the prior art, not only layers are usually deposited liquid on a hardened previous layer, the follow up polymerization thus forming a transition zone with the previous layer, but furthermore, one often observes a gradient of polymerization within one same layer, the top of the layer, closer to the light source being often more polymerized than the bottom of the same layer. In any case, such repetitive alternation of optical properties induces the formation of diffracting defects, hereafter stacking defects. These stacking defects are even further noticeable if the optical device is built with layers arranged sensibly parallel to the optical axis.

Accordingly, using the disclosure, within the parts corresponding to the core areas, the transition from one layer to the other is more homogeneous and those stacking defects are minimized or even avoided.

On the contrary, in this example, the skin 21 of each layer receives (in one time or in several times) a curing surface energy E1 which is higher than or equal to the critical Jacobs energy Ec1 and preferably higher than or equal to the Jacobs energy $E_{J1}$ before a new layer is placed onto it.

More specifically, the curing surface energy E1 applied to the skin 21 (the first area A1) is higher or equal to a second predetermined energy threshold T1 that is equal to or greater than the Jacobs energy Ec1 or $E_{J1}$.

This first predetermined energy threshold T1 is for example a recommended energy derived from the Jacobs' equation previously introduced. In this example the recommended energy is equal to the Jacobs energy $E_{J1}$ directly derived from the Jacobs' equation plus an extra-energy so as to ensure a high conversion rate of the curable material, for example the energy may correspond to the energy necessary to bring to a solid state a virtual layer having a thickness increased by about 50% to about 200%, when applying the Jacobs' equation. This recommended energy may alternatively be the energy value recommended for printing directly a layer of said material by conventional practices in 3D printing which do not proceed using the building delay method which forms part of layers using less energy than the Jacobs energy.

For example, this recommended energy $E_{J1}$ is determined such that the conversion rate in the skin 20 is greater than 95% before a new layer of curable material is placed onto the considered layer.

In an alternative embodiment, the first threshold T1 is the first Jacobs energy $E_{J1}$ at the first wavelength, and the first curing energy E1 may have the value of such first threshold T1.

The advantage of building the skin area according to this method is that the core area(s) may be built according to the previously exposed method while enabling the shape of the manufactured device to be respected. The skin anchors each layer with the previously formed layers, maintaining in position the partially cured parts of the core areas that may be manufactured within a skin area. Accordingly, the sliced outline is respected despite the presence of external stress when displacing the formed layers and/or applying further layers of material.

The patent application EP 19305829.4 explains especially how is determined the geometry of the skin for this embodiment (skin/core embodiment), and will not be described in more details hereafter.

However, the disclosure of EP 19305829.4 has been found by the applicants as improvable. The current disclosure will explain hereafter how to improve the geometry of the skin 21, especially in the Z direction, orthogonal to the plans respectively formed by the layers.

In fact, the applicant has discovered that the building delay method combined with the skin/core embodiment described in the patent application EP 19305829.4 may present a limit which is inherent to the constrain of the curable material formulation leading to a unique medium-large Dp. In other word, previously, the curable material was irradiated by a sole wavelength leading to a sole Dp within the curable material. Therefore, so as to satisfy the building delay method and the skin/core embodiment, a Dp of generally around 100 µm was previously used for forming both the skin 21 and the core 22.

However, the use of this medium-large Dp does not enable to form a skin with the most precise geometry, especially in the Z direction. In particular, two cases may be distinguished: the down-skin case and up-skin case.

Figure 8:
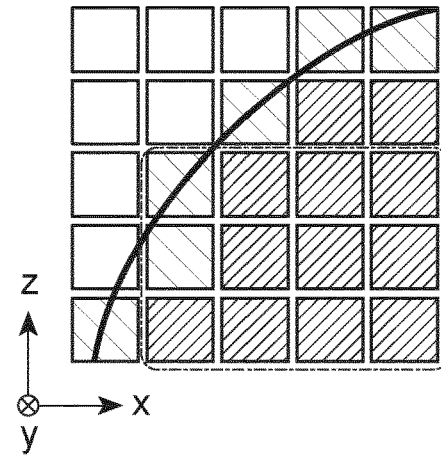
FIG. 8 represents a plane view of a sliced outline of the optical article element and of the pixels generated by the manufacturing system on the curable material, especially in an upper part of the optical article (up-skin case)

According to the disclosure, the "up-skin case" corresponds to the situation of FIG. 8 where the volume elements (voxels) to be polymerized are situated under the sliced outline C1, with regard to a direction of stacking layers of material (see FIG. 8). In other words, the up-skin case corresponds to parts of the skin for which the matching voxels of the layer later deposited are not supposed to be cured, thus forming a local upper limit of the device to manufacture.

Figure 7:
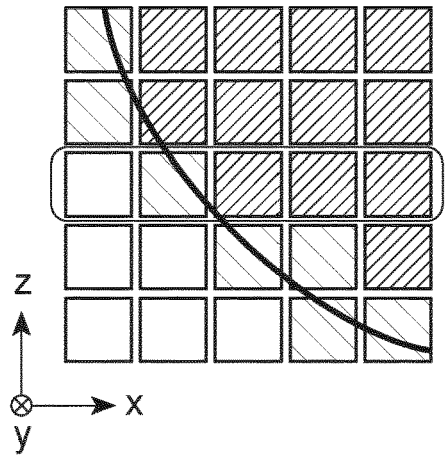
FIG. 7 represents a plane view of a sliced outline of the optical article element and of the pixels generated by the manufacturing system on the curable material, especially in a bottom part of the optical article (down-skin case)

The "down-skin case" corresponds to the situation of FIG. 7 where the voxels to be polymerized are situated above the sliced outline, with regard to a direction of stacking layers of the material. In other words, the "down-skin" corresponds to parts of the skin for which the matching voxels of the layers previously deposited are not supposed to be cured, thus forming a local lower limit of the device to manufacture; the down-skin being thus principally formed over unpolymerized material.

It is to be noted that in case where the skin has a thickness greater than the thickness of one layer, the above is considered true, despite some voxels of an up-skin having other voxels of the up-skin deposited over them, or despite some voxels of the down-skin being deposited on previously formed voxels of the down-skin.

For instance, previously, in the down-skin case, due to the use of a relatively high Dp relative to the thickness (th) of the layers, a polymerization may take place over undesired areas: zones outside the skin 21 may be polymerized. Indeed, the irradiation of the layers of the down-skin may overlap on unpolymerized voxels of previous layers and may initiate a polymerization and in some cases may ultimately cure those voxels in a solid state. This geometrical over curing may cure voxel over multiple times the thickness of the layers, typically over a thickness corresponding to 1 or 1.5 or 2 times the depth penetration.

Thus, it is desirable, for the skin areas, especially for down-skin areas to use a polymerization process having a low Dp value. However it has been shown that high Dp value was important to perform the building delay process for the core areas. This tension explains why a medium Dp value was often presented in the disclosure of EP 19305829.4.

However, the present disclosure, and the ability to tailor, within a same process, a Dp value to an area being manufactured, and especially in the specific described embodiment (that does not narrow the scope of the disclosure), enables that a low Dp is used to form the skin 21 and a large Dp is used to form the core 22.

According to other embodiments of the disclosure, the use of different wavelengths with the skin/core embodiment combined with the building method may be improved further so as enhance the printing accuracy. Indeed, if the light depth penetration value Dp2 used for forming the core 22 is too high relative to the layer thickness and more generally to the total thickness of the skin 21, zones outside the skin 21 may be polymerized.

Hence, preferably the optical element 100 may also comprise other areas generally situated between the core 22 and the skin 21. In general, each of these other areas being preferably formed with an intermediate light depth penetration Dp whose value is equal to Dp2 or decreases from the core 22 to the skin 21.

Several solutions have been proposed by the applicant and will be described below.

A first solution proposed by the applicant so as to avoid that the polymerization takes places over undesired areas is to build a skin 21 with the first wavelength λ1 having a small Dp1. In addition, in an embodiment, the skin 21 is built on the whole surface of the periphery of the optical element 100 with a total thickness $th_{skin}$ than is equal to or higher than Dp2 (Dp used for forming the core 22), especially as measured from bottom to top, ie along the direction of a construction axis Z. Here, $th_{skin}$ does not correspond to the thickness of a layer, but corresponds to the total thickness of the skin 21 once it is cured (in this example, the total thickness of the skin 22 is the same on the whole of the lenses, in other words, the skin 21 is built in the same manner on the whole of the lens). Moreover, the second wavelength having a large Dp (Dp2) is used for forming the core 22 and perform the building delay process. This enables that once some layers of the core 22 are irradiated using the greater Dp (Dp2), the energy used to irradiate those layers doesn't impact much the unpolymerized material that is beyond the skin 21.

Finally, an intermediate area, named "core near to up-skin" that is formed from third volume elements V3 and built with the same Dp2 of the core. The disclosure above may also be applied while using in the skin and core energy tailored to reach a same conversion rate for skin and core, and using the different wavelength only so as to obtain different depth penetration values.

Hence, as illustrated on example 4 (FIG. 9), according to a characteristic of the disclosure, showing an up-skin construction, the second area A2 also comprises at least a third volume element V3 situated directly under the first area A1 (skin), said third volume element V3 being formed by irradiating the curable material 50 at the second light depth penetration value Dp2 with the second wavelength λ2 (wavelength used for forming the core).

Here, the third volume element V3 is irradiated with a third curing surface energy E3 that is higher than the second curing surface energy E2 and in particular, that is higher than the second critical Jacobs energy $E_{C2}$. Accordingly, this intermediate zone has a conversion rate closer to the one planned for material intended to be manufactured above, here the skin, while being irradiated with a light depth penetration value which is close to the one of the material or layers already formed below it, here the core. Such teaching may be applied mutatis mutandis for a case where the skin is locally below a part of the "core" as will be illustrated below.

Moreover, the total thickness of the skin 21 (one it has cured) (in the example 4: 400 μm is higher than the second light depth penetration value Dp2 (or Dp core) (here 350 μm).

A second solution proposed by the applicant is to locally adapt the total thickness of the skin 21. Indeed, the total thickness of the skin can be locally different than other zones if the thickness of the skin 21 is set following a vertical distance, like $Dp_{core}$ vs. distance to reach the lowest voxel. In other words, the skin 21 is managed following the distance between the considerate voxel and the contour of the lens, especially the down-skin contour. According example 5 (FIG. 10), the printing parameters or manufacturing parameters are the same as example 4, but the total thickness of the skin 21 on the whole surface of the optical element 100 is not uniform but varies especially in the down-skin and up-skin zones.

In particular, the local thickness of the skin 21 may be made to have a thickness corresponding to the thicker of the lateral thickness that might be needed to bring mechanical strength to the contour of a layer and the depth penetration of the light used to polymerize the layers directly above the skin. In the case that the core and the skin are designed to have similar conversion rates during manufacturing, only the second aspect is needed. In the case that only two different depth penetration values are used, the second aspect used to determine the thickness is based on the greater depth penetration value. In case that more than two different depth penetration values are used, the second aspect used to determine the thickness is based not on the greater depth penetration value but can be based on the second to smallest depth penetration value.

For example, the total thickness of the skin 21 in the up-skin zone (vertical distance) is lower than or equal to the thickness of 5 layers, preferably, lower than or equal to 2 layers. For instance, the total thickness of the skin 21 in the up-skin zone (vertical distance) is lower than or equal 50 µm, preferably lower than or equal to 30 µm.

In addition, in an embodiment, the total thickness of the skin 21 in the down-skin zone (that depends of the vertical distance (height/number of layers) between the current layer and the down-skin contour in view of Dp2 (Dp core) is higher than or equal to Dp2.

It is noted that if the building orientation is following top to bottom, then the origin of the vertical distance is the up current layer, whereas if the building orientation if following the bottom to top, then the origin of the vertical distance is the down current layer. Here, we always follow the propagation direction of the UV light to set the origin.

A third solution proposed, which may be used in part in combination with the other solutions, is to decrease E2 (curing surface energy applied to the core 22) until the polymerization outside the part is negligible. In some case, depending of the geometry and down-skin contour, the light dose (E) may even be set to 0 for some areas of some layers despite being a part of the optical device that is expected to be eventually fully polymerized. That way often leads to a core which is still in liquid/gel state after the printing. In such case, the polymerization is completed by thermal or UV curing after printing.

The example 6 illustrated this above embodiment. The manufacturing parameters are similar than the ones of example 4, except that the optical article of example 6 does not comprise third volume elements (or a core near to up-skin portion) and the intensity of E2 is lower than the one used for example 4. Here, the second area A2 (core) has been irradiated with a curing surface energy E2 that has a low intensity (3.5 mJ), especially far lower than the second critical Jacob energy Ec2 (21 mJ) for the wavelength used.

Figure 11:
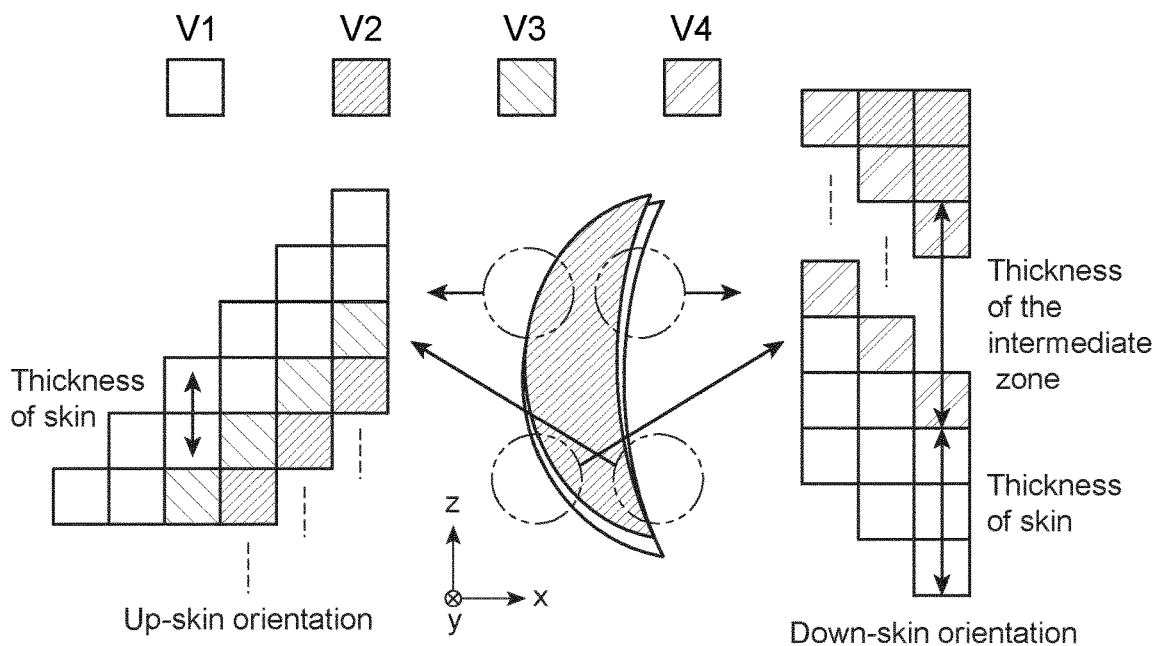

A fourth solution proposed by the applicant is illustrated at example 7 (FIG. 11). This fourth solution may also be used in part in combination with the other solutions. According to this embodiment, the manufacturing parameters are similar to the ones of example 4, except that the total thickness of the skin is not uniform on the whole surface of the optical element 100 and the optical element comprises another intermediate area, named "core near to down-skin". This intermediate area comprises especially a fourth volume element V4 formed by irradiating the curable material 50 at the light depth penetration value different from the one of the skin Dp1.

Hence, according to a characteristic of the disclosure, the second area A2 also comprises at least a fourth volume element V4 (core near to down-skin), this fourth volume element V4 being situated directly above the first area A1.

It is to be noted that here, and within the whole of the specification, unless explicitly stated otherwise, "above" means upstream if one follow up the curing energy propagation direction, and especially means a volume element formed in a layer deposited or former or manufactured after the considered part which is "below".

Especially,
the fourth volume element V4 is formed by curing the curable material 50 at the second light depth penetration value Dp2 with the second wavelength λ2, preferably by applying a fourth curing surface energy E4 that is lower than the second curing surface energy E2 (E core); and/or
the fourth volume element V4 being formed by curing the curable material 50 at the second light depth penetration value Dp2 with the second wavelength λ2 by applying a fourth curing surface energy E4 that hardens the fourth volume element V4 (core near to down-skin) less than the first curing surface energy E1 (E skin) hardens the first volume element V1 (skin) and preferably less than the second curing surface energy E2 (E core) hardens the second volume element V2 (core).

In fact, the fourth solution developed here defines an internal contour of the skin 21 that correspond to the external contour of the core 22. In other words, the aim is to obtain a zone between the core 22 and the skin 21 (core near to down-skin) where the light dose (here E4) is lower than the light dose applied to the core (here E2=E core) in order to not polymerize outside the skin 21. In addition, the thickness of this intermediate zone (or core near to down-skin) is between $Dp_{core}$ and $(Dp_{core}-th_{skin})$. The energy E4 provided depend on the thickness of the skin 21, and the position of the fourth volume element with regard to the down-skin contour, so that the energy which overpass the down-skin contour stays near the value of the induction energy, such that no or nearly no polymerization takes place. The state of this intermediate zone would be solid/gel enough (after multiple exposures through the polymerization of later volume elements situated above the fourth volume element and formed after) to support the building of the core 22. The reducing of the curing surface energy E4 of the core 22 near to the down-skin contour also enables to have a thinner skin 21. As for example 6, since the energy E4 provided inside the intermediate zone is lower than the core E2, the polymerization may be completed by thermal or UV curing after printing.

Figure 12:
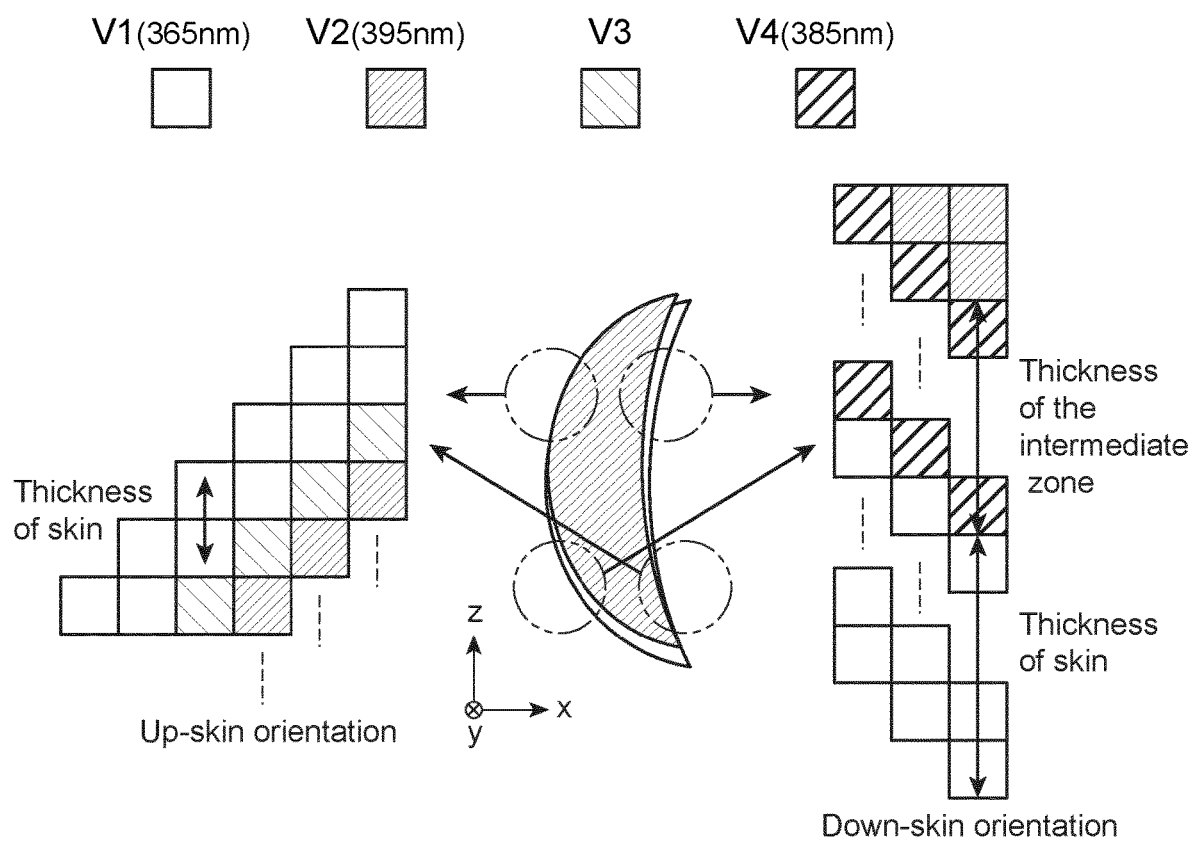

A fifth solution proposed by the applicant is illustrated at example 8 (FIG. 12). This solution may also be used in part in combination with the other solutions. According to this embodiment, the manufacturing parameters are similar than the ones of example 7, except that an intermediate zone (that is also a core near to down-skin) is formed by polymerizing material with a intermediate $Dp_{int}$, using a third wavelength (here 385 nm).

According to this embodiment, the second area A2 also comprises a fourth volume element V4, the fourth volume element V4 is situated directly above the first area A1, the fourth volume element V4 being formed by curing the curable material 50 with an intermediate light depth penetration value $Dp_{int}$ which is ranging from the first light depth penetration value Dp1 and the second light depth penetration value Dp2.

In an embodiment of the fifth solution, the fourth volume element V4 is formed by applying a fourth curing surface energy E4 that hardens the fourth volume element V4 less than the first curing surface energy E1 hardens the first volume element V1.

Here, as compared to example 7, in order to have a more advanced solid state in the intermediate zone (core near to down-skin), a third wavelength of irradiation that is different from the first λ1 and the second λ2 wavelengths has been used (λ1=365 nm, λ2=395 nm and λ4=385 nm). As a consequence, an additional set of Ec/Dp is used for this intermediate zone. The thickness of the skin can thus be adjusted by taking into account the Dp of the intermediate zone, and at least would be between $Dp_{core}$ and $Dp_{skin}$. In an embodiment, the curing energy having the Dp for the intermediate zone, here provided by means of light having the third wavelength, can be used when the distance between the down-skin contour and the current layer containing the part of the fourth volume element is higher or equal to the Dp of the intermediate zone. In such case, the curing energy having the Dp for the core, provided here by means of light having the second wavelength, can be used when the distance between the down-skin contour and the current layer is higher or equal to the Dp of the core.

The fourth volume element V4 may have any of the characteristics of the fourth or fifth embodiment; and in a same manufactured device, different volume elements corresponding to fourth volume elements may have different one of the abovementioned characteristics.

Figure 13:
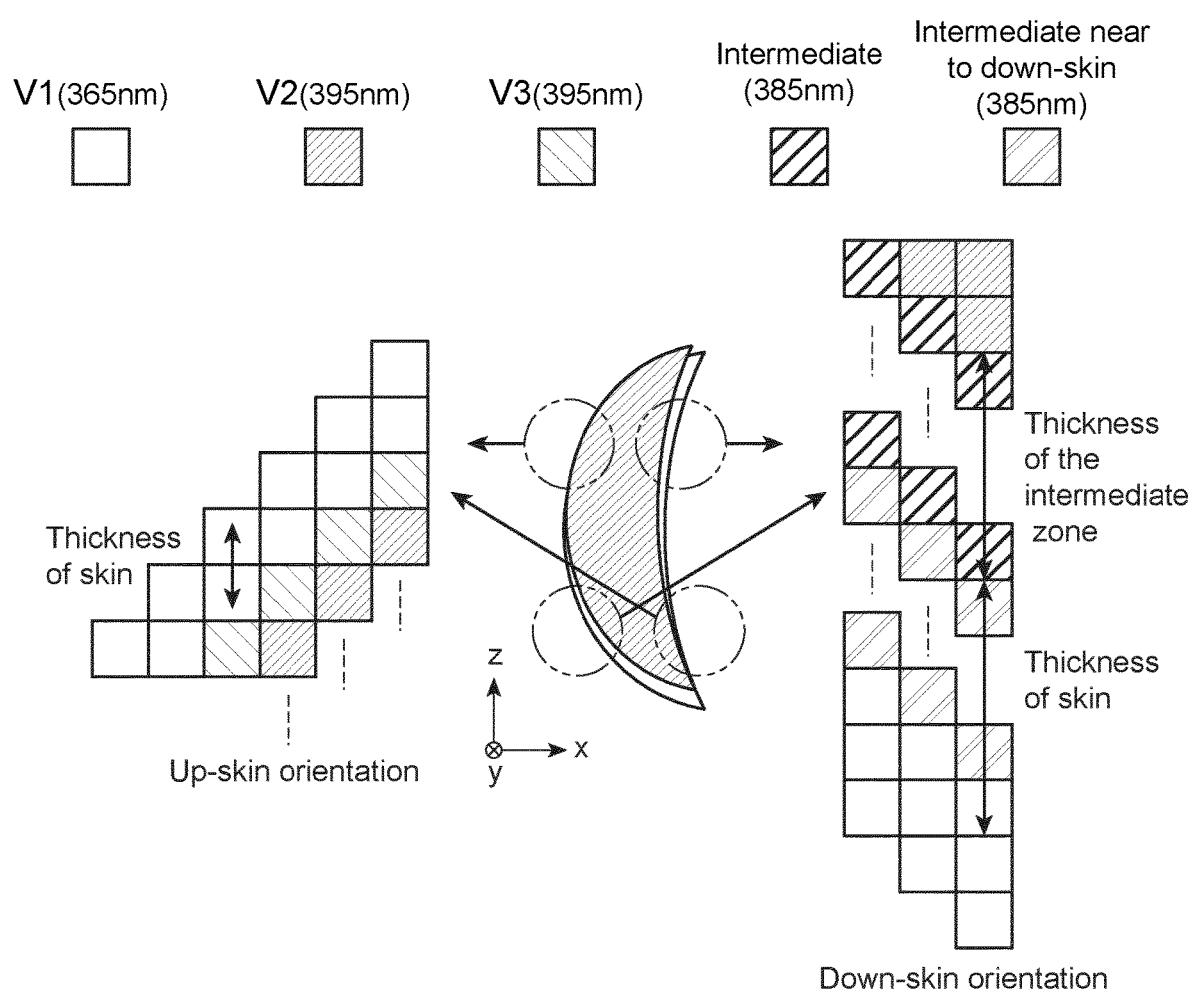

A sixth solution proposed by the applicant is illustrated at example 9 (FIG. 13). This solution may also be used in part in combination with the other solutions. According to this embodiment, the manufacturing parameters are similar than the ones of example 8, except that another intermediate zone named "inter to down-skin" (that is also a core near to down-skin) is formed with the intermediate wavelength (385 nm) (mix between examples 7 and 8).

According to this embodiment, the second area A2 (core) also comprises a third area A3 (intermediate zone) situated directly above the first area A1 (skin), said third area A3 is formed of a lower portion (intermediate near the down-skin) that is the closest from the first area A1 and an upper portion (intermediate) located directly above said lower portion, wherein the upper portion and the lower portion are formed by curing the curable material 50 at a light depth penetration value that is intermediate between the first light depth penetration value Dp1 and the second light depth penetration value Dp2, preferably lower than the second light depth penetration value Dp2, and in such embodiment, the lower portion is formed by applying a curing surface energy that is lower than the curing surface energy applied to the upper portion.

Here, as compared to example 8, if the Dp for the intermediate zone is too high in view of the skin's thickness, the light dose of the lower portion of the third area A3 is reduced, as in the fourth solution, such that no or nearly no polymerization takes place over the down-skin contour (at least in the bottom layers of the intermediate zone). In some case, depending of the geometry and down-skin contour, the light dose can be even more set to 0 for some layers of the lower portion of the third area A3. The reducing of the energy of the intermediate zone near to the down-skin contour also enables to have a device which can be manufactured with a thinner skin than without using this embodiment.

A seventh solution proposed by the applicant is illustrated at example 10. This solution may also be used in part in combination with the other solutions. According to this embodiment, the second area A2 also comprises a third area A3 situated directly above the first area A1, wherein said third area A3 is formed layer by layer by curing said curable material 50 and being composed of at least two portions, said at least two portions considered from the first area A1 to the second area A2 being irradiated with curing energy having distinct DPs that increase starting from the portion closer to the first area A1.

Here, several wavelengths, corresponding to several Dps, have been used to form different intermediates zones between the core and the skin. Generally, it is more suitable to have a gap of 5 nm between two different wavelengths for feasibility reasons, in particular to ensure that the curing energies have distinct enough wavelength, and thus distinct enough Dp. In that way, it is possible to have access to multiple Dp between $Dp_{skin}$ and $Dp_{core}$. As example, if the light source at 365 nm is attributed for the skin and 395 nm for the core, there are 5 different Dp which can be use in the intermediate zone in order to not overpass the down skin contour (see example 10). This way is the best to have the thinner skin (1 thickness/voxel), high Dp for the core, and perform a building delay the nearer to the skin.

Figure 14:
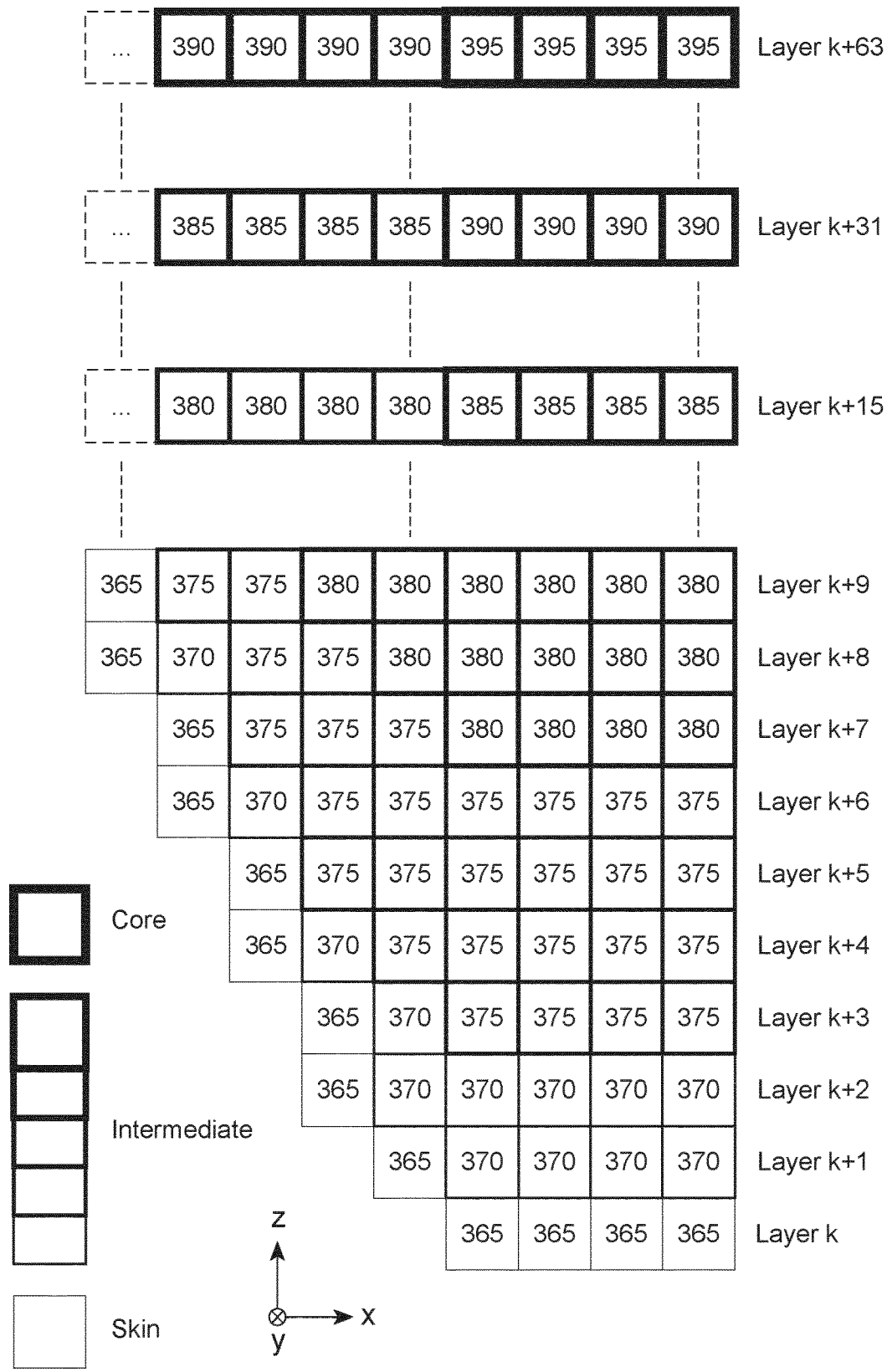

Example 11 illustrates also this solution. It is a generic example normalized to the thickness of layers (FIG. 14).

When all the curing steps are achieved, the optical element can be handled and transported in order to be processed by another machine, thanks to the rigidity of the skin 21. Here, this other machine is able to operate a further final step of final post-curing of all the curable material 50 of the optical element 100, thanks to an UV light curing or a thermal curing. Alternatively, it may be post-processed as mentioned above before and/or after the final post-curing, and/or cleaned before the post-curing.

It is to be noted that the disclosure also applies when an optical device is obtained without needing a final post-curing and/or without needing a post process.

EXAMPLES

The following examples illustrate the present disclosure in a more detailed, but non-limiting manner.

TABLE 1

| Products (g/L) | Role | F1 | F2 | F3 | F4 | F5 | F6 | F7 |
|---|---|---|---|---|---|---|---|---|
| BLS 234 | A | 0.657 | 0.186 | 0.342 | 0.447 | 0.447 | 0.407 | 3.4E−4 |
| PHENAZINE | A |  | 0.03 | 0.132 | 0.031 | 0.031 | 0.272 | 1.0E−4 |
| SALICYALDEHYDE | A | 83 | 48 | 45 |  |  | 80 | 48.9 |
| BENETEX OB+ | A/B |  | 0.045 | 0.011 | 0.009 | 0.009 | 0.023 | 3.5E−5 |
| AVOBENZONE | A |  | 0.293 | 0.044 | 0.025 | 0.025 | 0.053 | 7.6E−5 |
| OCTOCRYLENE | A |  |  |  |  |  |  | 26.1 |
| OXYBENZONE | A |  |  | 32.61 |  |  | 14 | 11.3 |
| TINUVIN 171 | A |  |  |  |  |  |  |  |
| TPO | A/C | 5 | 5 | 2.5 | 1.5 | 1.5 | 1.5 | 3 |
| BAPO | A/C |  |  | 2.5 | 3.5 | 3.5 | 3.5 | 3.2 |
| Benzoyl peroxide | C |  |  |  |  | 1 |  |  |

A: UV-blocker, B: Optical brightener, C: Initiator, D: Monomer/Oligomer/Resin

TABLE 2

| Dp (μm)/Ec (mJ) at | F1 | F2 | F3 | F4 | F5 | F6 | F7 |
|---|---|---|---|---|---|---|---|
| 365 nm | 30/— | 36/— | 32/— | 20/~7 | 20/~8 | 20/~6 | 35/~4 |
| 370 nm |  |  |  |  |  |  | 69/~5 |
| 375 nm |  |  | 106/— |  |  |  | 152/~8 |

TABLE 2-continued

| Dp (μm)/Ec (mJ) at | F1 | F2 | F3 | F4 | F5 | F6 | F7 |
|---|---|---|---|---|---|---|---|
| 380 nm | | | | | | | 317/~10 |
| 385 nm | 500/— | | 260/— | | | 170/~18 | 458/~12 |
| 390 nm | | | | | | | 537/~15 |
| 395 nm | | 400/— | 490/— | 350/~33 | 350/~36 | 350/~30 | |
| 400 nm | | | | | | | |
| Transmission* | 91% | 90% | 54% | | | | |

*transmission measured at 420 nm, for 2 mm thick optical elements.

a) Determination of the Curable Material Composition by a Computer Program (Examples 1 to 3, Tables 1, 2, FIG. 3-5)

As previously mentioned, the applicant has developed a method that enables to establish the appropriate formulation of the curable material/resin according to some specifics constraints (here after "input data", which includes at least a number of different Dp that are desired and/or approximate values or relative order of magnitude of such Dp) and has developed specific equations that notably enable a computer element to provide the suitable curable composition (Output data). Table 1 and 21 correspond to the results of the examples below. Table 1 provides the composition of seven different curable materials, and table 21 the corresponding Dp in μm for different wavelength, and in some case the approximate Jacob's critical energy. It is important to note that the Dp at a given value wavelength depends in part to the absorbance of the material at said wavelength.

Example 1

In this example 1, the constraints are the selection of 2 wavelengths of irradiation ($\lambda 1=365$ nm and $\lambda 2=385$ nm) so as to obtain respectively a Dp1 (or Dpskin) of 30 μm and a Dp2 (or Dpcore) of 500 μm and the value of transmission (of the cured material) at 420 nm that should be higher than or equal to 90% for a sample having a thickness of 2 mm.

Input:
  Dp required at 365 nm=30 μm
  Dp required at 385 nm=500 μm
  Transmission required at 420 nm for 2 mm of thickness≥90%.

Then, by playing on the concentrations of different UV absorbers, the following output data are obtained and give the suitable curable material formulation F1 of Table 1 with the expected output properties of table 2.

Output:
  Dp at 365 nm=30 μm
  Dp at 385 nm=500 μm
  Transmission at 420 nm for 2 mm of thickness=92%

FIG. 3 shows the Dp values of this curable material composition as function of the wavelength.

TABLE 3

| Input: | Output: |
|---|---|
| Dp required at 365 nm = 30 μm<br>Dp required at 385 nm = 500 μm<br>Transmission required at 420 nm for 2 mm of thickness ≥ 90%. | See F1 in the Table 1 & 2. |

Example 2

In this example 2, the constraints are the selection of 2 wavelengths of irradiation ($\lambda 1=365$ nm and $22=395$ nm) so as to obtain respectively a Dp1 of 30 μm±20% and a Dp2 of 500 μm±20% and the value of transmission (of the cured material) at 420 nm that should be higher than or equal to 90% for a sample having a thickness of 2 mm.

Therefore, in this example, the second wavelength has been change (395 nm instead of 385 nm) and a certain freedom degrees on the intended Dp1 and Dp2 have been added.

Input:
  Dp required at 365 nm=30 μm±20%
  Dp required at 395 nm=500 μm±20%
  Transmission required at 420 nm for 2 mm of thickness≥90%

Then, by playing on the concentrations of different UV absorbers, the following output data are obtained and give the suitable curable material formulation F2 of Table 1 with the expected output properties of table 2.

Output:
  Dp at 365 nm=36 μm
  Dp at 395 nm=400 μm
  Transmission required at 420 nm for 2 mm of thickness=94%

TABLE 4

| Input: | Output: |
|---|---|
| Dp required at 365 nm = 30 μm ± 20%<br>Dp required at 395 nm = 500 μm ± 20%<br>Transmission required at 420 nm for 2 mm of thickness ≥ 50% | See F2 in the Table 1 & 2. |

FIG. 4 shows the Dp values of this curable material composition as function of the wavelength.

Example 3

In this example 3, the constraints are the selection of 4 wavelengths of irradiation so as to obtain Dp1 ($\lambda 1$), Dp2 ($\lambda 2$) and intermediate DPs ($\lambda 3$, $\lambda 4$) and the value of transmission (of the cured material) at 420 nm that should be higher than or equal to 50% for a sample having a thickness of 2 mm.

Input:
  Dp1 required at 365 nm=30 μm±5%
  Dp, nt required at 375 nm=120 μm±20%
  Dp, nt required at 385 nm=300 μm±20%
  Dp2 required at 395 nm=700 μm±30%
  Transmission required at 420 nm for 2 mm of thickness≥90%

Then, by playing on the concentrations of different UV absorbers, the following output data are obtained and give the suitable curable material formulation F3 of Table 1 with the expected output properties of table 2.

Output:
  Dp at 365 nm=32 µm
  Dp at 375 nm=97 µm
  Dp at 385 nm=240 µm
  Dp at 395 nm=567 µm
  Transmission required at 420 nm for 2 mm of thickness>=50%

TABLE 5

| Input: | Output: |
|---|---|
| Dp1 required at 365 nm = 30 µm ± 5% | |
| $Dp_{int}$ required at 375 nm = 120 µm ± 20% | See F3 in the |
| $Dp_{int}$ required at 385 nm = 300 µm ± 20% | Table 1 & 2. |
| Dp2 required at 395 nm = 700 µm ± 30% | |
| Transmission required at 420 nm for 2 mm of thickness ≥ 50% | |

FIG. 5 shows the Dp values of this curable material composition as function of the wavelength.

B) Examples Performed with the Building Delay Method Combined with the Skin/Core Embodiment (Examples 4 to 9, FIG. 9-14)

For the following illustrative examples 4 to 9 (and not necessarily optimized), different curable material compositions have been selected or determined. These curable material compositions are based on acrylate monomers, UV-blockers and photoinitiator have been selected.

For each of these curable material compositions, the Jacob's experiments have been carried out so as to determine for each of the selected wavelength the critical Jacob energy Ec and the predetermined light depth penetration value for Dp1, Dp2 or other intermediate Dps and an attenuation factor of 1/Dp, with a liquid state corresponding to a conversion rate below 30%, and a solid state, determined according to Jacob's methodology, occurring above a conversion rate of 70%. In these examples, it is further chosen to have devices manufactured using layers with a thickness of at least 10 µm and to have a skin width of 3 voxels.

We directly apply on each layer a total dose of $E_{core}$ in the core 22 and of $E_{skin}$ in the skin 21 of the optical element 100. Also, according to the examples, we also directly apply a total dose of $E_{core\ near\ to\ up-skin}$, $E_{core\ near\ to\ down-skin}$ and/or $E_{intermediate}$ so as to form the up-skin portion and/or respectively the down-skin portion at the periphery of the optical element. This corresponds to reaching the Jacobs energy in a given layer of the core area after irradiating the voxels of the given layer through at least 2 or 3 more layers.

The features of the projected image are as follows:
  Pixel size=30×30 µm,
  Shadow areas size=10×30 µm.
Between two layers, the pattern is shifted of (the initial layer being k):
  10 µm in the X direction at k+1 layer,
  10 µm in the −Y direction at k+2 layer,
  10 µm in the −X direction at k+3 layer
  (then, the shifting process restarts from the beginning).
The description deals with a DLP-SLA method but it is noted that the disclosure also applies with other methods, when the material is cured layer by layer, or pseudo layer by pseudo layer, or drop by drop.

Figure 9:
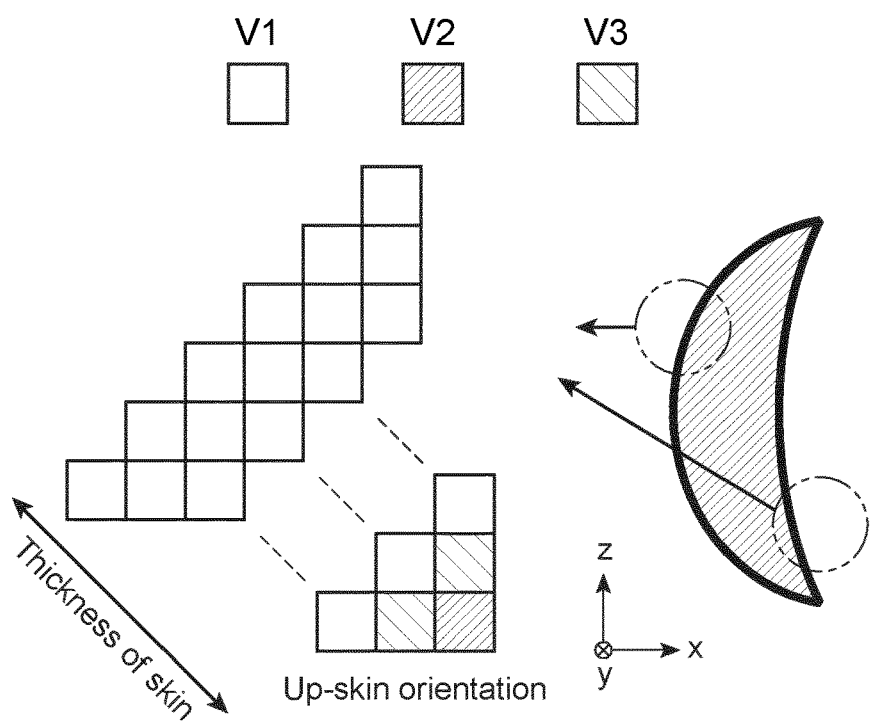
FIGS. 9 to 14 represent six solutions for positioning the different volumes elements forming the optical element according to the disclosure, especially so as to improve the printing accuracy in the z direction (for the "down-skin" and "up-skin" cases).

Example 4 (FIG. 9)

The F4 curable material composition, presented in tables 1 and 2, has been used to carry out the following example.

The process parameters for manufacturing the optical element may be resumed in the following table 6 and FIG. 9:

TABLE 6

Skin-core embodiment

Down-skin: thickness of the skin = 400 µm (≥Dp core)
Up-skin: thickness of the skin = 400 µm (≥Dp core)
Printing parameters Thickness of layers: th = 15 µm
Energy parameters

| | Wavelength/Dp | Light dose (E) | Comments |
|---|---|---|---|
| Skin voxels (V1) | λ1 = 365 nm<br>Dp1 = 20 µm | E1 = $E_{skin}$ = 25.4 mJ | E1 = $E_{J365}$ for 1*th |
| Core voxels (V2) | λ2 = 395 nm<br>Dp2 = 350 µm | E2 = $E_{core}$ = 8 mJ | E2 < $E_{c395}$ (between 0.3 and 0.5 Ec)<br>Building delay~3 layers |
| Core near to up-skin voxels (V3) | λ2 = 395 nm<br>Dp2 = 350 µm | E3 = $E_{core\ near\ to\ up-skin}$ = 23.9 mJ | E3 = $E_{J395}$ for 3*th |

Post-printing parameters

Uv lamp for 10 minutes under nitrogen, then optionally 100° C. for 1 h

The building delay of 3 layers corresponds to a process enabling to reach the Jacobs critical energy in a given layer of the core area after irradiating the voxels of the given layer through at least 3 more layers.

An ophthalmic lens that presents the desired geometry and has no diffracting effects is thus obtained.

Figure 10:
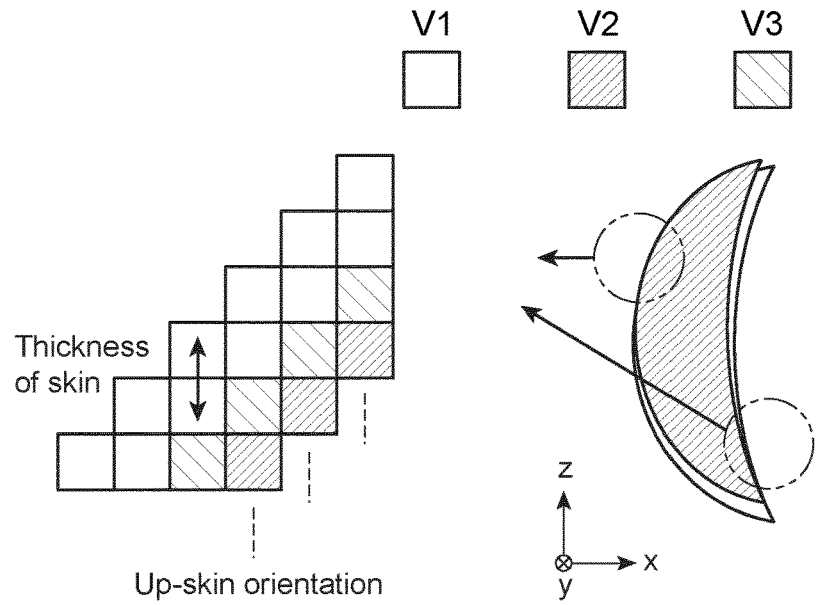

Example 5 (FIG. 10)

The F4 curable material composition has also been used to carry out the following example.

The process parameters for manufacturing the optical element may be resumed in the following table 7 and FIG. 10:

TABLE 7

| Skin-core embodiment |
|---|
| Down-skin: Thickness of the skin depends of vertical distance between the current layer and the down-skin contour in view of $Dp_{core}$<br>Up-skin: Thickness of the skin = Vertical distance of 30 μm (=2 layers) |

Printing parameters

Thickness of layers: th = 15 μm
Skin-core embodiment

Energy parameters

| | Wavelength/Dp | Light dose (E) | Comments |
|---|---|---|---|
| Skin voxels (V1) | λ1 = 365 nm<br>Dp1 = 20 μm | E1 = $E_{skin}$ = 25.4 mJ | E1 = $E_{J365}$ for 1*th |
| Core voxels (V2) | λ2 = 395 nm<br>Dp2 = 350 μm | E2 = $E_{core}$ = 8 mJ | E2 < $E_{c395}$ (~0.3-05 Ec)<br>Building delay~3 layers |
| Core voxels near to up-skin (V3) | λ2 = 395 nm<br>Dp2 = 350 μm | E3 = $E_{core\ near\ to\ up\text{-}skin}$ = 23.9 mJ | E3 = $E_{J395}$ for 3*th |

Post-printing parameters

Uv lamp for 10 minutes under nitrogen, then optionally 100° C. for 1 h

An ophthalmic lens that presents the desired geometry and has no diffracting effects is thus obtained.

Example 6

The F5 curable material composition has been used to carry out the following example.

The process parameters for manufacturing the optical element may be resumed in the following table 8:

TABLE 8

| Skin-core embodiment |
|---|
| Down-skin: Thickness of the skin = 350 μm (≥$Dp_{core}$)<br>Up-skin: Thickness of the skin = 350 μm (≥$Dp_{core}$) |

Printing parameters

Thickness of layers: th = 25 μm

Energy parameters

| | Wavelength/Dp | Light dose (E) | Comments |
|---|---|---|---|
| Skin voxels (V1) | λ1 = 365 nm<br>Dp1 = 30 μm | E1 = $E_{skin}$ = 27.6 | E1 = $E_{J365}$ for 1*th |
| Core voxels (V2) | λ2 = 395 nm<br>Dp2 = 350 μm | E2 = $E_{core}$ = 3.5 mJ | E2 < $E_{c395}$ Only few zones pass $E_{J395}$ (23 mJ) - the polymerization is completed after printing. |

Post-printing parameters

UV lamp for 10 minutes under nitrogen, then 100° C. for 1 h to complete the polymerization An ophthalmic lens that presents the desired geometry and has no diffracting effects is thus obtained.

Example 7 (FIG. 11)

The F5 curable material composition has also been used to carry out the following example.

The process parameters for manufacturing the optical element may be resumed in the following table 9 and FIG. 11:

TABLE 9

| Skin-core embodiment |
| --- |
| Down-skin: Thickness of the skin = Vertical distance of 45 μm (=3 layers)<br>Intermediate zone: Thickness of the intermediate zone = Vertical distance of 320 μm<br>Up-skin: Thickness of the skin = Vertical distance of 30 μm (=2 layers)<br>Printing parameters |
| Thickness of layers: th = 15 μm<br>Energy parameters |

| | Wavelength/Dp | Light dose (E) | Comments |
| --- | --- | --- | --- |
| Skin voxels (V1) | $\lambda 1 = 365$ nm<br>$Dp1 = 20$ μm | $E1 = E_{skin} = 25.4$ mJ | $E1 = E_{J365}$ for 1*th |
| Core voxels (V2) | $\lambda 2 = 395$ nm<br>$Dp2 = 350$ μm | $E2 = E_{core} = 8$ mJ | $E2 < E_{c395}$<br>Building delay~3 layers |
| Core voxels near to up-skin (V3) | $\lambda 2 = 395$ nm<br>$Dp2 = 350$ μm | $E3 = E_{core\ near\ to\ up\text{-}skin} = 23.9$ mJ | $E3 = E_{J395}$ for 3*th |
| Core voxels near To down-skin (V4) | $\lambda 2 = 395$ nm<br>$Dp2 = 350$ μm | $E4 = E_{core\ near\ to\ down\text{-}skin} = 2$ mJ | $E4 < E_{c395}$; only few zones pass EJ395 (23 mJ) - the polymerization is completed after printing. |

| Post-printing parameters |
| --- |
| UV lamp for 10 minutes under nitrogen, then 100° C. for 1 h to complete the polymerization |

An ophthalmic lens that presents the desired geometry and has no diffracting effects is thus obtained.

Example 8 (FIG. 12)

The F6 curable material composition has been used to carry out the following example.

The process parameters for manufacturing the optical element may be resumed in the following table 10 and FIG. 12:

TABLE 10

| Skin-core embodiment |
| --- |
| Down-skin: Thickness of the skin = Vertical distance of 170 μm (set following $Dp_{intermediate}$)<br>Intermediate zone: Depends of vertical distance between the down-skin contour and the current layer vs. $Dp_{core}$<br>Up-skin: Thickness of the skin = Vertical distance of 30 μm (=2 layers)<br>Printing parameters |
| Thickness of layers: th = 15 μm<br>Energy parameters |

| | Wavelength/Dp | Light dose (E) | Comments |
| --- | --- | --- | --- |
| Skin voxels (V1) | $\lambda 1 = 365$ nm<br>$Dp1 = 20$ μm | $E1 = E_{skin} = 25.4$ mJ | $E1 = E_{J365}$ for 1*th |
| Intermediate voxels (V4) | $\lambda 4 = \lambda_{int} = 385$ nm<br>$Dp_{int} = 170$ μm | $E4 = E_{int} = 8$ mJ | $E4 < E_{c385}$<br>Building delay~2 layers |
| Core voxels (V2) | $\lambda 2 = 395$ nm<br>$Dp2 = 350$ μm | $E2 = E_{core} = 8$ mJ | $E2 < E_{c395}$<br>Building delay~3 layers |

| Post-printing parameters |
| --- |
| Uv lamp for 10 minutes under nitrogen, then optionally 100° C. for 1 h |

An ophthalmic lens that presents the desired geometry and has no diffracting effects is thus obtained.

Example 9 (FIG. 13)

The F6 curable material composition has also been used to carry out the following example. The process parameters for manufacturing the optical element may be resumed in the following table 11 and FIG. 13:

TABLE 11

Skin-core embodiment

Down-skin: Thickness of the skin = Vertical distance of 45 μm = 3 layers (set lower than $Dp_{intermediate}$)
Intermediate zone: Depends of vertical distance between the down-skin contour and the current layer vs. $Dp_{core}$
Up-skin: Thickness of the skin = Vertical distance of 30 μm (=2 layers)

Printing parameters

Thickness of layers: th = 15 μm
Skin-core embodiment

Energy parameters

|  | Wavelength/Dp | Light dose (E) | Comments |
|---|---|---|---|
| Skin voxels (V1) | $\lambda1$ = 365 nm<br>Dp1 = 20 μm | E1 = $E_{skin}$ = 25.4 mJ | E1 = $E_{J365}$ for 1*th |
| Intermediate voxels (V4 lower portion) | $\lambda4 = \lambda_{int}$ = 385 nm<br>$Dp_{int}$ = 170 μm | $E_{int}$ = 8 mJ | $E_{int} < E_{c385}$<br>Building delay~2 layers |
| Intermediate voxels near to down-skin (V4 upper portion) | $\lambda4 = \lambda_{int}$ = 385 nm<br>$Dp_{int}$ = 170 μm | $E_{inter\ near\ to\ down-skin}$ = 4 mJ | Einter near to down-skin < $E_{c385}$ |
| Core voxels (V2) | $\lambda2$ = 395 nm<br>Dp2 = 350 μm | E2 = $E_{core}$ = 8 mJ | E2 < $E_{c395}$<br>Building delay~3 layers |
| Core voxels near to up-skin (V3) | $\lambda2$ = 395 nm<br>Dp2 = 350 μm | E3 = $E_{core\ near\ to\ up-skin}$ = 23.9 mJ | E3 = $E_{J395}$ for 3*th |

Post-printing parameters

Uv lamp for 10 minutes under nitrogen, then optionally 100° C. for 1 h

An ophthalmic lens that presents the desired geometry 30 and has no diffracting effects is thus obtained.

Example 10

The F7 curable material composition has been used to carry out the following example.

TABLE 12

| Wavelengths | 365 | 370 | 375 | 380 | 385 | 390 | 395 |
|---|---|---|---|---|---|---|---|
| Dp (mm) | 32 μm | 63 μm | 145 μm | 326 μm | 417 μm | 546 μm | 640 μm |
| Ec (mJ) | 4 | 5 | 8 | 10 | 12 | 15 | 21 |

TABLE 13

Skin-core embodiment

Down-skin: Thickness of the skin = 30 μm
Intermediate zone: Depends of the vertical distance between down skin contour and the current layer. The different intermediate wavelengths of irradiation are activated depending of this distance
Up-skin: Thickness of the skin = 30 μm Printing parameters Thickness of layers: th = 15 μm
Skin-core embodiment Energy parameters

|  | Wavelength | Light dose (E) | Comments |
|---|---|---|---|
| Skin voxels (V1) | $\lambda1$ = 365 nm | E1 = $E_{skin}$ = 6.39 mJ | E1 = $E_{J365}$ for 1*th |
| Intermediate voxels #1 | $\lambda2$ = 370 nm | E2 = 2.5 mJ | E2 < $E_{c370}$<br>Building delay~2-3 layers |
| Intermediate voxels #2 | $\lambda3$ = 375 nm | E3 = 2.6 mJ | E3 < $E_{c375}$<br>Building delay~4 layers |
| Intermediate voxels #3 | $\lambda4$ = 380 nm | E4 = 2.5 mJ | E4 < $E_{c380}$<br>Building delay~5 layers |
| Intermediate voxels #4 | $\lambda5$ = 385 nm | E5 = 3 mJ | E5 < $E_{c385}$<br>Building delay~5 layers |
| Intermediate voxels #5 | $\lambda6$ = 390 nm | E6 = 3.75 mJ | E6 < $E_{c385}$<br>Building delay~5 layers |
| Core voxels | $\lambda7$ = 400 nm | E7 = $E_{core}$ = 8 mJ | E7 < $E_{c400}$<br>Building delay~12 layers |

Post-printing parameters

Uv lamp for 10 minutes under nitrogen, then optionally 100° C. for 1 h

An ophthalmic lens that presents the desired geometry and has no diffracting effects is thus obtained.

Example 11 (FIG. 14)

This use the same composition as example 10. In this example, the "external voxels" are built with the skin wavelength in any case.

Especially, the increasing of the Dp is following:

$$Dp_{x\,nm}(n,th)=2^{n-1}th$$

where,
n is the increment number of the wavelength from the skin to the core.
th the thickness of the layers.

TABLE 14

| n | 1 | 2 | 3 | 4 | 5 | 6 | 7 |
|---|---|---|---|---|---|---|---|
| Wavelengths | 365 nm | 370 nm | 375 nm | 380 nm | 385 nm | 390 nm | 395 nm |
| Dp (mm) | 1*th | 2*th | 4*th | 8*th | 16*th | 32*th | 64*th |

The invention claimed is:

1. Process for the production of an optical element by using an additive manufacturing technology comprising:
   providing a curable material, with a predetermined layer thickness;
   curing said curable material layer by layer, inside sliced outlines (C1) corresponding to the intersection between the mean plane of each layer and an external 3D contour of the optical element, the geometry of each sliced outline (C1) being determined according to the geometry of said optical element, said optical element comprising at least: a first volume element (V1) and a second volume element (V2), by:
   forming the first volume element (V1) by irradiating the curable material with at least a first curing surface energy (E1) with a first light depth penetration value within the curable material (Dp1), and
   forming the second volume element (V2) by irradiating the curable material with at least a second curing surface energy (E2) with a second light depth penetration value within the curable material (Dp2),
   wherein said second light depth penetration value within the curable material (Dp2) is different from the first light depth penetration value within the curable material (Dp1); and
   wherein the optical article is built by layer by layer and the difference between the second light depth penetration value within the curable material (Dp2) and the first light depth penetration value within the curable material (Dp1) is equal to or higher than an average layer thickness.

2. The process according to claim 1, wherein the first light depth penetration value within the curable material (Dp1) is obtained by irradiating the curable material at the first wavelength (λ1) and the second light depth penetration value within the curable material (Dp2) is obtained by irradiating the curable material at a second wavelength (λ2).

3. The process according to claim 1, wherein the first light depth penetration value within the curable material (Dp1) is equal to or higher than at least three times the average layer thickness.

4. The process according to claim 1, wherein the first volume element (V1) is situated into a first area (A1), that extends along said sliced outlines (C1), and the second volume element (V2) is situated into a second area (A2), said second area (A2) being mostly situated within the first area (A1).

5. The process according to claim 1, wherein the first light depth penetration value within the curable material (Dp1) is strictly lower than the second light depth penetration value within the curable material (Dp2).

6. The process according to claim 5, wherein the first volume element (V1) is more cured by the first curing surface energy (E1) than the second volume element (V2) is cured by the second curing surface energy (E2).

7. The process according to claim 2, wherein the curing surface energy (E1) applied to the first volume element (V1) is higher than or equal to a first predetermined energy threshold (T1), said first predetermined energy threshold (T1) being determined for the first volume element (V1) of a given layer by using the Jacobs' equation defined as $\{E_{J1}=E_{C1}*\exp(th1/D_{P1})\}$ at the first wavelength (λ1) with:
   "Ej$_1$" a Jacobs energy necessary to polymerize a thickness th1, so that it becomes solid within the meaning of Jacobs;
   "th$_1$" the thickness of the layer containing the first volume element (V1);
   "Dp$_1$" the light depth penetration value within the curable material; and
   "Ec$_1$" a first critical Jacobs energy for the curable material;
   and wherein said first predetermined energy threshold (T1) is higher than or equal to this critical Jacobs energy (Ec$_1$) or to this Jacobs energy (Ej$_1$).

8. The process according to claim 2, wherein the curing surface energy (E2) applied to the second volume element (V2) is strictly lower than a second predetermined energy threshold (T2), said second predetermined energy threshold (T2) being determined for the second volume element (V2) of a given layer by using the Jacobs' equation defined as $\{E_{J2}=E_{C2}*\exp(th_2/D_{P2})\}$ at the second wavelength (λ2) with:
   "Ej$_2$" a Jacobs energy necessary to polymerize a thickness th2, so that it becomes solid within the meaning of Jacobs;
   "th$_2$" the thickness of the layer containing the second volume element (V2);
   "Dp$_2$" the light depth penetration value of the curing energy within the curable material; and
   "Ec$_2$" a second critical Jacobs energy for the curable material;
   and wherein said second predetermined energy threshold (T2) is strictly lower than this Jacobs energy (Ej$_2$).

9. The process according to claim 4, wherein the second area (A2) also comprises a third volume element (V3) and a fourth volume element (V4), the third volume element (V3) is situated directly under a region of the first area (A1), the fourth volume element (V4) is situated directly above a region of the first area (A1),
   the third volume element (V3) being formed by curing the curable material at the second light depth penetration value (Dp2) with the second wavelength (λ2); or
   the fourth volume element (V4) being formed by curing the curable material at the second light depth penetration value (Dp2) with the second wavelength (λ2); or
   the fourth volume element (V4) being formed by curing the curable material at the second light depth penetration value (Dp2) with the second wavelength (λ2) by applying a fourth curing surface energy (E4) that is smaller than the first curing surface energy (E1) or that hardens the fourth volume element (V4) less than the first curing surface energy (E1) which hardens the first volume element (V1).

10. The process according to claim 4, wherein:
the second area (A2) also comprises a fourth volume element (V4), the fourth volume element (V4) is situated directly above a region of the first area (A1), the fourth volume element (V4) being formed by curing the curable material with an intermediate light depth penetration value ($Dp_{int}$) which is ranging from the first light depth penetration value (Dp1) and the second light depth penetration value (Dp2), preferably by applying a fourth curing surface energy (E4) that hardens the fourth volume element (V4) less than the first curing surface energy (E1) hardens the first volume element (V1); or
the second area (A2) also comprises a third area (A3) situated directly above the first area (A1), said third area (A3) is formed of a lower portion that is the closest from the first area (A1) and an upper portion located directly above said lower portion, wherein the upper portion and the lower portion are formed by curing the curable material at a light depth penetration value that is intermediate between the first light depth penetration value (Dp1) and the second light depth penetration value (Dp2), preferably lower than the second light depth penetration value (Dp2).

11. The process according to claim 4, wherein the second area (A2) also comprises a third area (A3) situated directly above the first area (A1), wherein said third area (A3) is formed layer by layer by curing said curable material and being composed of at least two portions, said two portions considered from the first area (A1) to the second area (A2) being irradiated with distinct depth penetration values that increase.

12. The process according to claim 2, comprising a prior step of:
determining at least part of an absorption spectrum of the curable material with regard to a determined wavelength range in the ultraviolet (200-450 nm), or in the visible light or in the near infrared (700-2500 nm), preferably within a range between 290 to 430 nm;
determining the corresponding light depth penetration values within the curable material as function of the wavelength for at least two different wavelengths;
selecting at least the first wavelength ($\lambda$1) and the second wavelength ($\lambda$2) having respectively the first light depth penetration value (Dp1) and the second light depth penetration value (Dp2), the second light depth penetration value (Dp2) being different from the first light depth penetration value (Dp1); and
determining the process based on the identified first light depth penetration value (Dp1) and the second light depth penetration value (Dp2).

13. The process according to claim 2, comprising a prior step of:
determining a composition of the curable material that enables to obtain the desired first light depth penetration value within the curable material (Dp1) by irradiating said curable material with the first wavelength ($\lambda$1) and the desired second light depth penetration value within the curable material (Dp2) by irradiating said curable material with the second wavelength ($\lambda$2), the values of the first and second wavelength being predetermined before said prior step; this embodiment may thus comprise a step of manufacturing or receiving a curable material with said determined composition.

14. The process according to claim 13, comprising a prior step of providing of at least one irradiating device adapted to output at least two distinct wavelengths or wavelength ranges, of which one includes a first wavelength ($\lambda$1) and a second includes a second wavelength ($\lambda$2), wherein the step of providing a curable material comprises:
providing an initial curable material composition and providing or determining an absorption spectrum of said initial curable material composition; or
providing an absorption spectrum of said initial curable material composition;
providing a list of UV absorbers;
determining a selected list of UV absorbers and their concentration to add to the composition, so as to obtain a first light depth penetration value (Dp1) at the first wavelength ($\lambda$1) and the second light depth penetration value (Dp2) at the second wavelength ($\lambda$2); and
providing the final curable material composition obtained by adding to said initial curable material the determined UV absorbers at their determined concentration.

15. The process according to claim 12, wherein the first light depth penetration value within the curable material (Dp1) and second light depth penetration value within the curable material (Dp2) are determined to be within a first range of light depth penetration values for the first light depth penetration value (Dp1) and within a second range of light depth penetration values for the second light depth penetration value (Dp2), said first range and second range having at least one value determined in a previous step.

16. A manufacturing system for manufacturing an optical element-from a curable material using an additive manufacturing technology comprising:
a container suitable for containing a curable material;
a support suitable for supporting the optical element to be formed;
a forming unit suitable for curing said curable material at least inside a sliced outline (C1) whose geometry is determined according to the geometry of said optical element and that is able to use at least a first wavelength ($\lambda$1) and a second wavelength ($\lambda$2); and
a computer element programmed to control said forming unit so as to apply at least a first curing surface energy (E1) with a first light depth penetration value of the curing energy within the curable material (Dp1) or with a first wavelength ($\lambda$1) and a second curing surface energy (E2) with a second light depth penetration value of the curing energy within the curable material (Dp2) or respectively with a second wavelength ($\lambda$2) onto the curable material;
wherein said second light depth penetration value of the curing energy within the curable material (Dp2) is different from the first light depth penetration value of the curing energy within the curable material (Dp1), or respectively wherein the first wavelength ($\lambda$1) is different from the second wavelength ($\lambda$2); and
wherein the optical article is built by layer by layer and the difference between the second light depth penetration value within the curable material (Dp2) and the first light depth penetration value within the curable material (Dp1) is equal to or higher than an average layer thickness.

17. The process according to claim 4, wherein said second area (A2) is totally situated within the first area (A1).

18. The process according to claim 8, wherein said second predetermined energy threshold (T2) is strictly lower than this critical Jacobs energy ($Ec_2$).

* * * * *